(12) United States Patent
Sohn

(10) Patent No.: US 12,499,942 B2  
(45) Date of Patent: Dec. 16, 2025

(54) STORAGE DEVICE INCLUDING AUXILIARY POWER SUPPLY DEVICE AND OPERATING METHOD THEREOF

(71) Applicant: Samsung Electronics Co., Ltd., Suwon-si (KR)

(72) Inventor: Min Sohn, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 568 days.

(21) Appl. No.: 17/958,668

(22) Filed: Oct. 3, 2022

(65) Prior Publication Data

US 2023/0140904 A1   May 11, 2023

(30) Foreign Application Priority Data

Nov. 10, 2021 (KR) .................. 10-2021-0154259  
Mar. 2, 2022 (KR) .................. 10-2022-0027024

(51) Int. Cl.
  *G11C 14/00* (2006.01)
  *G06F 1/26* (2006.01)
  (Continued)

(52) U.S. Cl.
  CPC .......... *G11C 14/0018* (2013.01); *G06F 1/263* (2013.01); *G06F 1/30* (2013.01);
  (Continued)

(58) Field of Classification Search
  CPC ..... G11C 14/0018; G11C 5/141; G11C 5/143; G11C 16/30; H02J 7/0047; H02J 7/00712;
  (Continued)

(56) References Cited

U.S. PATENT DOCUMENTS 7,661,002 B2 * 2/2010 Pecone .................. G06F 1/305  
                                                                714/14  
9,882,428 B2   1/2018 Calhoun et al.  
(Continued)

FOREIGN PATENT DOCUMENTS

EP   2916412 A1   9/2015  
JP   2007-311256 A   11/2007  
(Continued)

OTHER PUBLICATIONS

Extended European Search Report issued Jun. 28, 2023 in European Application No. 22201790.7.

(Continued)

*Primary Examiner* — Jay W. Radke  
(74) *Attorney, Agent, or Firm* — Harness, Dickey & Pierce, P.L.C.

(57) ABSTRACT

A storage device includes a power supply device including an auxiliary power supply device providing auxiliary power, configured to generate a deterioration monitoring signal indicating a degree of deterioration of the auxiliary power supply device, and configured to generate an output voltage based on external power or the auxiliary power; and a main system configured to operate based on the output voltage and perform a dump operation for backing up data in a sudden power off (SPO) situation, wherein the main system compares the degree of deterioration of the auxiliary power supply device with a preset reference value in response to the deterioration monitoring signal, and generates a voltage scaling command for controlling the power supply device to convert an average voltage level of the output voltage to a dynamic voltage scaling (DVS) level based on a result of the comparison.

20 Claims, 10 Drawing Sheets

(51) Int. Cl.
  *G06F 1/30* (2006.01)
  *G06F 1/3212* (2019.01)
  *G06F 1/3234* (2019.01)
  *G06F 1/3296* (2019.01)
  *G11C 5/14* (2006.01)
  *H02J 7/00* (2006.01)

(52) U.S. Cl.
  CPC .......... *G06F 1/3212* (2013.01); *G06F 1/3275* (2013.01); *G06F 1/3296* (2013.01); *G11C 5/141* (2013.01); *G11C 5/143* (2013.01); *H02J 7/0047* (2013.01); *H02J 7/007* (2013.01)

(58) Field of Classification Search
  CPC ........ H02J 7/007; G06F 1/263; G06F 1/3212; G06F 1/3275; G06F 1/3296; G06F 1/30
  See application file for complete search history.

(56) References Cited

U.S. PATENT DOCUMENTS

| | | | |
|---|---|---|---|
| 10,657,043 | B2 | 5/2020 | Park et al. |
| 10,705,155 | B2 | 7/2020 | An et al. |
| 10,726,879 | B2 | 7/2020 | Berman et al. |
| 10,818,370 | B1 | 10/2020 | Wang et al. |
| 10,908,249 | B2 | 2/2021 | Nam et al. |
| 2007/0033432 | A1 | 2/2007 | Pecone et al. |
| 2014/0232333 | A1 | 8/2014 | Kim et al. |
| 2014/0293723 | A1* | 10/2014 | Grover .................. G11C 7/06 365/210.1 |
| 2014/0317436 | A1 | 10/2014 | Yuasa et al. |
| 2018/0059761 | A1 | 3/2018 | An et al. |
| 2019/0180793 | A1 | 6/2019 | Berman et al. |
| 2021/0074332 | A1 | 3/2021 | Lee et al. |
| 2021/0074336 | A1 | 3/2021 | Kumagai et al. |
| 2021/0091555 | A1 | 3/2021 | Narita |
| 2021/0231720 | A1 | 7/2021 | Butler et al. |

FOREIGN PATENT DOCUMENTS

| | | |
|---|---|---|
| KR | 10-2010-0066000 A | 6/2010 |
| KR | 10-2014-0139503 A | 12/2014 |
| KR | 10-2017-0048866 A | 5/2017 |
| KR | 10-2020-0001158 A | 1/2020 |

OTHER PUBLICATIONS

Allowance issued May 4, 2023 in Korean Application No. 10-2022-0027024.
Partial European Search Report issued Mar. 23, 2023 in European Application No. 22201790.7.

* cited by examiner

STORAGE DEVICE INCLUDING AUXILIARY POWER SUPPLY DEVICE AND OPERATING METHOD THEREOF

CROSS-REFERENCE TO RELATED APPLICATIONS

This application is based on and claims priority under 35 U.S.C. § 119 to Korean Patent Application Nos. 10-2021-0154259, filed on Nov. 10, 2021, and 10-2022-0027024, field on Mar. 2, 2022, in the Korean Intellectual Property Office, the disclosures of which are incorporated by reference herein in their entireties.

BACKGROUND

The technical ideas of the inventive concepts relate to a storage device, and more particularly, to a storage device including an auxiliary power supply device for auxiliary supply of power to the storage device, and an operating method thereof.

In general, a memory system including memory devices and a memory controller operates by receiving external power. In addition, a sudden power off (SPO) situation in which power is suddenly cut off while the memory system is operating may occur. In this case, because the memory controller stores data using a volatile memory, data stored in the volatile memory may be lost or an operation (e.g., an erase operation, a write operation, etc.) being performed in a memory device may not be completed. In order to solve this problem, the memory system uses the auxiliary power supply device to complete an operation being performed and to perform an operation to back up data.

SUMMARY

A technical aspect of the inventive concepts provides a storage device that monitors the degree of deterioration of an auxiliary power supply device and operates in a dump mode based on an output voltage having a voltage level converted depending on a monitoring result.

The technical aspects of the inventive concepts are not limited to the technical aspect mentioned above, and other technical aspects not mentioned will be clearly understood by those skilled in the art from the following description.

According to an aspect of the inventive concepts, there is provided a storage device including: a power supply device including an auxiliary power supply device configured to provide an auxiliary power, the power supply device configured to monitor the auxiliary power supply device, generate a deterioration monitoring signal, indicating a degree of deterioration of the auxiliary power supply device, based on the monitoring of the auxiliary power supply device, and generate at least one output voltage based on external power or the auxiliary power; and a main system configured to operate based on the at least one output voltage, receive the deterioration monitoring signal, compare the degree of deterioration of the auxiliary power supply device with a reference value, and perform an operation of backing up data and generate a voltage scaling command for controlling the power supply device to convert an average voltage level of the output voltage to a dynamic voltage scaling (DVS) level.

According to another aspect of the inventive concepts, there is provided a storage device including an auxiliary power supply device configured to provide an auxiliary power; a power controller configured to output an internal power, having a constant voltage level, based on one of external power or the auxiliary power, to monitor the auxiliary power supply device, and to generate a deterioration monitoring signal, indicating a degree of deterioration of the auxiliary power supply device, based on the monitoring of the auxiliary power supply device; an operating voltage provider configured to generate at least one output voltages having a plurality of voltage levels, based on the internal power; and a controller configured to receive the deterioration monitoring signal, to compare the degree of deterioration of the auxiliary power supply device with a reference value in response to the deterioration monitoring signal, and to generate a voltage scaling command for controlling the operating voltage provider to convert an average voltage level of at least one of the output voltages to a dynamic voltage scaling (DVS) level based on a result of the comparison.

According to another aspect of the inventive concepts, there is provided a method of operating a storage device which comprises a power supply device including an auxiliary power supply device and a main system configured to operate based on at least one output voltage output from the power supply device, the method including: monitoring a degree of deterioration of the auxiliary power supply device; comparing the degree of deterioration of the auxiliary power supply device with a reference value; generating a voltage scaling command for converting an average voltage level of the at least one output voltage into a dynamic voltage scaling (DVS) level when the degree of deterioration of the auxiliary power supply device is less than the reference value; and executing the voltage scaling command when a sudden power-off occurs.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

Figure 1:
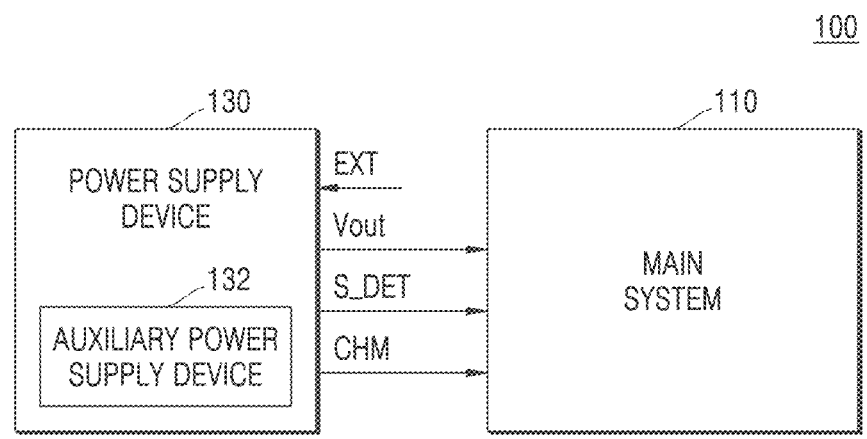
FIG. 1 is a block diagram illustrating a storage device according to at least one embodiment of the inventive concepts.

Hereinafter, various example embodiments of the inventive concepts will be described with reference to the accompanying drawings. Functional elements in the following description and the corresponding blocks shown in the drawings, unless indicated otherwise, may be implemented in processing circuitry such as hardware, software, or a combination thereof configured to perform a specific function. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. and/or the processing circuitry may include electrical components such as at least one of transistors, resistors, capacitors, etc. and/or may include electrical components such as logic gates including at least one of AND gates, OR gates, NAND gates, NOT gates, XOR gates, etc.

FIG. 1 is a block diagram illustrating a storage device according to at least one embodiment of the inventive concepts.

Referring to FIG. 1, a storage device 100 may include a power supply device 130 and a main system 110. The storage device 100 may be and/or be included in a solid state drive (SSD). For example, when the storage device 100 includes an SSD, the storage device 100 may correspond to a flash memory device including at least one flash memory chip (e.g., a NAND memory chip) for storing data.

The storage device 100 may include any one of various types of storage devices, such as a multi-media card (MMC), an embedded multi-media card (eMMC), a multimedia card, such as a reduced size MMC (RS-MMC) and a micro-MMC, a secure digital card in the form of a secure digital (SD) card, a mini-SD card, and a micro-SD card, a universal storage bus (USB) storage device, a universal flash storage (UFS) device, a storage device in the form of a personal computer memory card international association (PCMCIA) card, a storage device in the form of a peripheral component interconnection (PCI) card, a storage device in the form of a PCI-express (PCI-E) card, a compact flash (CF) card, a smart media card, a memory stick, and/or the like. However, examples of the storage device 100 are not limited to a specific memory system.

In addition, in some example embodiments, the storage device 100 may be manufactured in any one of various types of package types. For example, the storage device 100 may be manufactured in any one of various types of package types, such as a package on package (POP), a system in package (SIP), a system on chip (SOC) package, a multi-chip package (MCP), a chip on board (COB) package, a wafer-level fabricated package (WFP), a wafer-level stack package (WSP), and/or the like.

The power supply device 130 may provide at least one output voltage represented by Vout to the main system 110, and the main system 110 may perform an operation using the output voltage Vout. Herein, the output voltage Vout may mean the voltage required for (and/or used by) the main system 110 to operate. The output voltage Vout may be output to a plurality of channels, and the output voltages Vout output from each channel may have the same or different voltage levels.

The main system 110 may control the overall operation of the storage device 100, and may read (and write) data from (and to) memory. The main system 110 may receive a sudden power off detection signal S_DET from the power supply device 130, and may control the power supply device 130 to operate in external power supply mode or an auxiliary power supply mode, in response to the sudden power off detection signal S_DET. In addition, the main system 110 may perform a dump operation for backing up essential information required for system recovery in a sudden power off (SPO) situation.

The main system 110 may receive a deterioration monitoring signal CHM from the power supply device 130, and may control the voltage level of the output voltage Vout, in response to the deterioration monitoring signal CHM. Because the output voltage Vout may be output to a plurality of channels, the main system 110 may control the voltage level of the output voltage Vout output to each channel, respectively.

For example, the main system 110 may generate a voltage scaling command VSC that converts an average voltage level of the output voltage Vout to a dynamic voltage scaling (DVS) level. The DVS level may refer to a minimum voltage level for a nonvolatile memory device to perform a dump operation and to terminate all operations of the storage device 100 in an SPO situation. The DVS level may be a value preset (or otherwise set) by the user, and/or may be a value automatically calculated by the main system 110. The DVS level will be described in more detail with reference to FIGS. 6 and 9 to be described later.

The power supply device 130 may provide the output voltage Vout to the main system 110 by processing external power supply voltage EXT applied from the outside or auxiliary power applied from an auxiliary power 132. The power supply device 130 may include at least one power management integrated circuit (PMIC) (not illustrated).

The power supply device 130 may receive the external power supply voltage EXT from the outside and detect an SPO situation by monitoring the voltage level of the external power supply voltage EXT. For example, the power supply device 130 may detect the SPO in response to the voltage level of the external power supply voltage EXT being lower than the initially set (or otherwise determined) minimum allowable operation voltage level. The power supply device 130 may activate the sudden power-off detection signal S_DET as the SPO is sensed, and output the activated sudden power-off detection signal S_DET to the main system 110. For example, the deactivated sudden power off detection signal S_DET may have a low level, and the activated sudden power off detection signal S_DET may have a high level. However, the example embodiments are not limited thereto, and, for example, the deactivated sudden power off detection signal S_DET may have a high level, and the activated sudden power off detection signal S_DET may have a low level.

The power supply device 130 may receive the external power supply voltage EXT from the outside and detect an SPO situation by monitoring the voltage level of the external power supply voltage EXT. For example, the power supply device 130 may detect the SPO when the voltage level of the external power supply voltage EXT is lower than the initially set (or otherwise determined) minimum allowable operation voltage level. The power supply device 130 may activate the sudden power-off detection signal S_DET as the SPO is sensed, and output the activated sudden power-off detection signal S_DET to the main system 110. For example, the deactivated sudden power off detection signal S_DET may have a low level, and the activated sudden power off detection signal S_DET may have a high level. However, the example embodiments are not limited thereto, and, for example, the deactivated sudden power off detection signal S_DET may have a high level, and the activated sudden power off detection signal S_DET may have a low level.

The power supply device 130 may include an auxiliary power supply device 132. The auxiliary power supply device 132 may supply auxiliary power to the main system 110 in an SPO situation. For example, even if the supply of the external power supply voltage EXT supplied to the main system 110 is stopped due to the sudden power-off, the auxiliary power may be supplied to the main system 110, e.g., from the auxiliary power supply device 132. Accordingly, the main system 110 may be driven (or powered) based on the auxiliary power. In response to receiving the auxiliary power, the main system 110 may perform a dump operation. When the dump operation is completed, the main system 110 may normally terminate all operations of the storage device 100.

The power supply device 130 may monitor the degree of deterioration of the auxiliary power supply device 132. For example, because the amount of electrical energy charged in the auxiliary power supply device 132 may correspond to the degree of deterioration of the auxiliary power supply device 132, the power supply device 130 may monitor the degree of deterioration of the auxiliary power supply device 132 by using the electric energy charged in the auxiliary power supply device 132. The amount of electrical energy stored in the auxiliary power supply device 132 may be monitored in various ways. For example, the power supply device 130 may monitor the degree of deterioration of the auxiliary power supply device 132 by using the time required for the auxiliary power supply device 132 to be discharged, the time required for the auxiliary power supply device 132 to be fully charged, charging voltage of the auxiliary power supply device 132, and/or the like.

The power supply device 130 may generate a deterioration monitoring signal CHM, indicating the degree of deterioration of the auxiliary power supply device 132, based on a result of monitoring the degree of deterioration of the auxiliary power supply device 132, and may output the deterioration monitoring signal CHM to the main system 110. The main system 110 may control the voltage level of the output voltage Vout output from the power supply device 130, in response to the deterioration monitoring signal CHM. For example, the main system 110 may generate a voltage scaling command VSC that converts an average voltage level of the output voltage Vout output from the power supply device 130 into the DVS level, in response to the deterioration monitoring signal CHM.

According to at least one example embodiment, the power supply device 130 may monitor the degree of deterioration of the auxiliary power supply device 132, and the main system 110 may initiate a dump operation of the main system 110 in an SPO situation by controlling the voltage level of the output voltage Vout output from the power supply device 130 in response to the degree of deterioration of the auxiliary power supply device 132.

In addition, by controlling the voltage level of the output voltage Vout output from the power supply device 130 by the main system 110, power consumed to perform a dump operation in an SPO situation may be reduced. Accordingly, the life expectancy of the storage device 100 may be extended. In addition, at least one capacitor included in the auxiliary power supply device 132 may be omitted by reflecting the reduced power in the initial design of the storage device 100. Accordingly, the manufacturing cost of the storage device 100 may be reduced.

In addition, by controlling the voltage level of the output voltage Vout output from the power supply device 130 by the main system 110, power consumed to perform a dump operation in an SPO situation may be reduced. Accordingly, the life expectancy of the storage device 100 may be extended. In addition, at least some of a capacitor included in the auxiliary power supply device 132 may be omitted by reflecting the reduced power in the initial design of the storage device 100. Accordingly, the manufacturing cost of the storage device 100 may be reduced.

Hereinafter, each component of the storage device 100 is described in more detail with reference to FIGS. 2 to 6.

Figure 2:
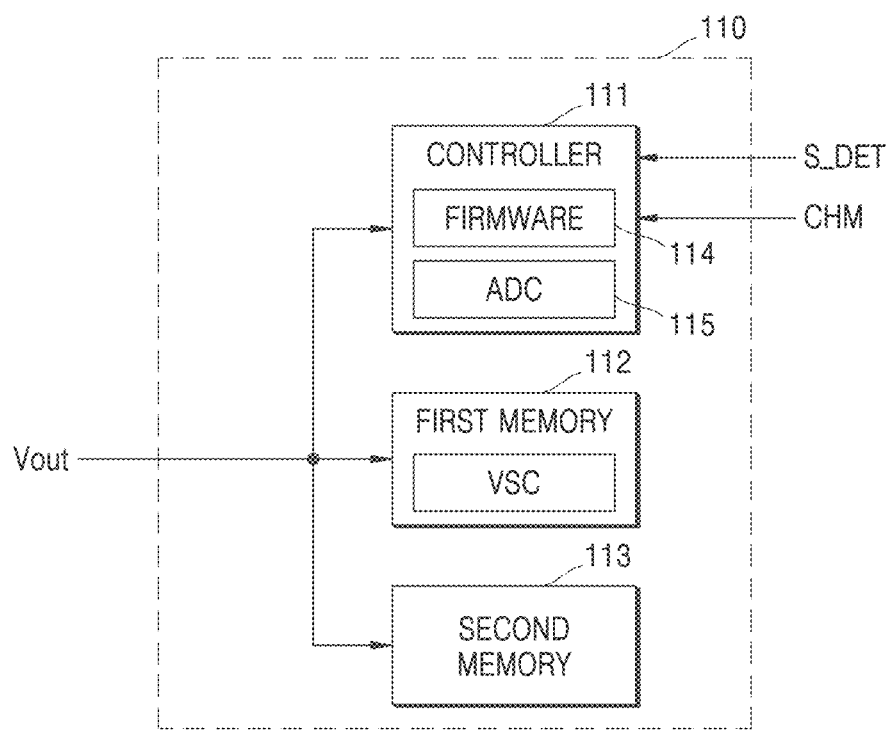
FIG. 2 is a block diagram showing the structure of a main system according to at least one embodiment of the inventive concepts.

FIG. 2 is a block diagram showing the structure of a main system according to at least one embodiment of the inventive concepts. FIG. 2 is a view of an example of the main system 110 of FIG. 1. Hereinafter, descriptions are made with reference to FIG. 1, and descriptions already given with reference to FIG. 1 are omitted.

Referring to FIG. 2, the main system 110 may include a controller 111, a first memory 112, and a second memory 113.

The controller 111 may analyze a signal input to the main system 110 and process an operation based on the analyzed result. The controller 111 may control the operation of the power supply device 130 of FIG. 1. For example, the controller 111 may control the power supply device 130 of FIG. 1 so that the power supply device 130 of FIG. 1 operates in an external power supply mode or an auxiliary power supply mode in response to the sudden power-off detection signal S_DET received from the power supply device 130 of FIG. 1.

The controller 111 may control operations, such as reading, writing, and erasing data of each of the first memory 112 and the second memory 113. For example, when the power supply device 130 of FIG. 1 operates in an auxiliary power supply mode, the controller 111 may control the first memory 112 and the second memory 113 so that the first memory 112 and the second memory 113 perform a dump operation. The dump operation may refer to an operation of backing up essential information necessary for system recovery.

The controller 111 may include firmware 114 and an analog-to-digital converter (ADC) 115. Although not shown in FIG. 2, the controller 111 may further include a processor and an operation memory, and the firmware 114 may be a component included in the processor. In some example embodiments, the controller 111 may be configured as (and/or include) processing circuitry such as a micro controller unit (MCU) and/or a central processing unit (CPU). The firmware 114 may refer to software or an application that processes data in response to a user's input.

The controller 111 may control the overall operation of the storage device 100 by using (or otherwise executing) the firmware 114. The controller 111 may control the power supply device 130 of FIG. 1 by using the firmware 114. However, the example embodiments are not limited thereto, and the controller 111 may perform an operation to control the power supply device 130 of FIG. 1 using, e.g., hardware, software, or a combination of hardware and software.

The controller 111 may receive a deterioration monitoring signal CHM from the power supply device 130 of FIG. 1. The controller 111 may receive the deterioration monitoring signal CHM continuously or at a predetermined period. For example, the predetermined period may be a value set by a user and/or determined based on a charging cycle of the auxiliary power supply device 132 of FIG. 1.

The controller 111 (e.g., using the firmware 114) may compare the degree of deterioration of the auxiliary power supply device 132 of FIG. 1 with a set reference value based on the deterioration monitoring signal CHM. The reference value may be a value representing the minimum amount of electrical energy that may ensure the dump operation of the main system 110 in an SPO situation. For example, the reference value may represent a limit value of electrical energy that may ensure the dump operation of the main system 110 in an SPO situation, even if the auxiliary power supply device 132 in FIG. 1 is deteriorated. In some example embodiments, the reference value may be a value input by a user.

The firmware 114 may generate a voltage scaling command VSC for converting the voltage level of the output voltage Vout, based on a result of comparing the degree of deterioration of the auxiliary power supply device 132 of FIG. 1 with a set (or otherwise determined) reference value. For example, the firmware 114 may generate the voltage scaling command VSC when the degree of deterioration of the auxiliary power supply device 132 of FIG. 1 is equal to or less than the set reference value.

The voltage scaling command VSC may be a command for converting an average voltage level of the output voltage Vout into a DVS level. The DVS level may be a minimum voltage level of the output voltage Vout such that and/or required to normally terminate all operations after the main system 110 performs a dump operation in an SPO situation. The firmware 114 may determine the DVS level in various ways. For example, the firmware 114 may determine the DVS level using at least one of the following first to third methods.

When determining the DVS level by the first method, the firmware 114 may calculate the DVS level based on the voltage level of the output voltage Vout. The ADC 115 may monitor the voltage level of the output voltage Vout in real time, and may provide the monitoring result to the firmware 114 in real time. The firmware 114 may extract the minimum voltage level and the maximum voltage level of the monitored output voltage Vout through the ADC 115 and calculate a delta value of the output voltage by using the extracted minimum voltage level and the maximum voltage level. The firmware 114 may determine the DVS level using the calculated delta value of the output voltage.

When determining the DVS level by the second method, the firmware 114 may calculate the DVS level based on the voltage level of the output voltage Vout. However, unlike the first method, the delta value of a preset (or otherwise determined) output voltage may be used. The delta value of the output voltage may be a value input by a user. The first and second methods in which the firmware 114 automatically calculates and determines the DVS level will be described in more detail with reference to FIGS. 8 and 9 to be described later.

When the DVS level is determined by the third method, the firmware 114 may output the DVS level as a preset (or otherwise determined) fixed value. The fixed value may be a value input by a user.

The firmware 114 may store the generated voltage scaling command VSC in the first memory 112. The firmware 114 may execute the voltage scaling command VSC stored in the first memory 112, based on the sudden power-off detection signal S_DET. The firmware 114 may convert the voltage level of the output voltage Vout to the DVS level by executing the voltage scaling command VSC when the sudden power off detection signal S_DET is activated.

For example, the firmware 114 may generate and store the voltage scaling command VSC in the first memory 112 when the degree of deterioration of the auxiliary power supply device 132 of FIG. 1 is equal to or less than the reference value, and may convert the voltage level of the output voltage Vout to the DVS level by executing the voltage scaling command VSC stored in the first memory 112 when an SPO occurs. Accordingly, the dump operation of the main system 110 may be performed with low power, and the life expectancy of the storage device 100 of FIG. 1 may be extended.

The first memory 112 and the second memory 113 may be different types of memory, respectively. One of the first memory 112 and the second memory 113 may be a buffer memory, and the other may be a main memory. For example, the first memory 112 may be a buffer memory, and the second memory 113 may be a main memory. The storage device 100 may be an SSD depending on the type of main memory. For example, when dynamic RAM (DRAM) is used as a buffer memory for the first memory 112 and a NAND flash memory is used as a main memory for the second memory 113, the storage device 100 may be a solid-state drive (SSD) device. However, the example embodiments are not limited to the storage device 100 being an SSD. Also, hereinafter, it will be described that the first memory 112 is a buffer memory and the second memory 113 is a main memory, but the example embodiments are not limited thereto.

The first memory 112 may be used as a data storage medium of the main system 110. The first memory 112 may temporarily store data input/output to the second memory 113. The first memory 112 may temporarily store the voltage scaling command VSC generated from the firmware 114. Data temporarily stored in the first memory 112 may be transmitted to the second memory 113 under the control of the controller 111. The first memory 112 may be configured as a volatile memory. For example, the first memory 112 may include at least one of static random access memory (SRAM) and DRAM.

The second memory 113 may be used as a data storage medium of the main system 110. The second memory 113 may include a plurality of nonvolatile memory devices. For example, the second memory 113 may include at least one of a non-volatile memory, such as electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), and ferroelectric random access memory (FRAM). In the following drawings, the second memory 113 is described as a NAND flash memory device, but the example embodiments are not limited thereto. Although not shown, the second memory 113 may include a memory cell array, a write/read circuit, and control logic.

Figure 3:
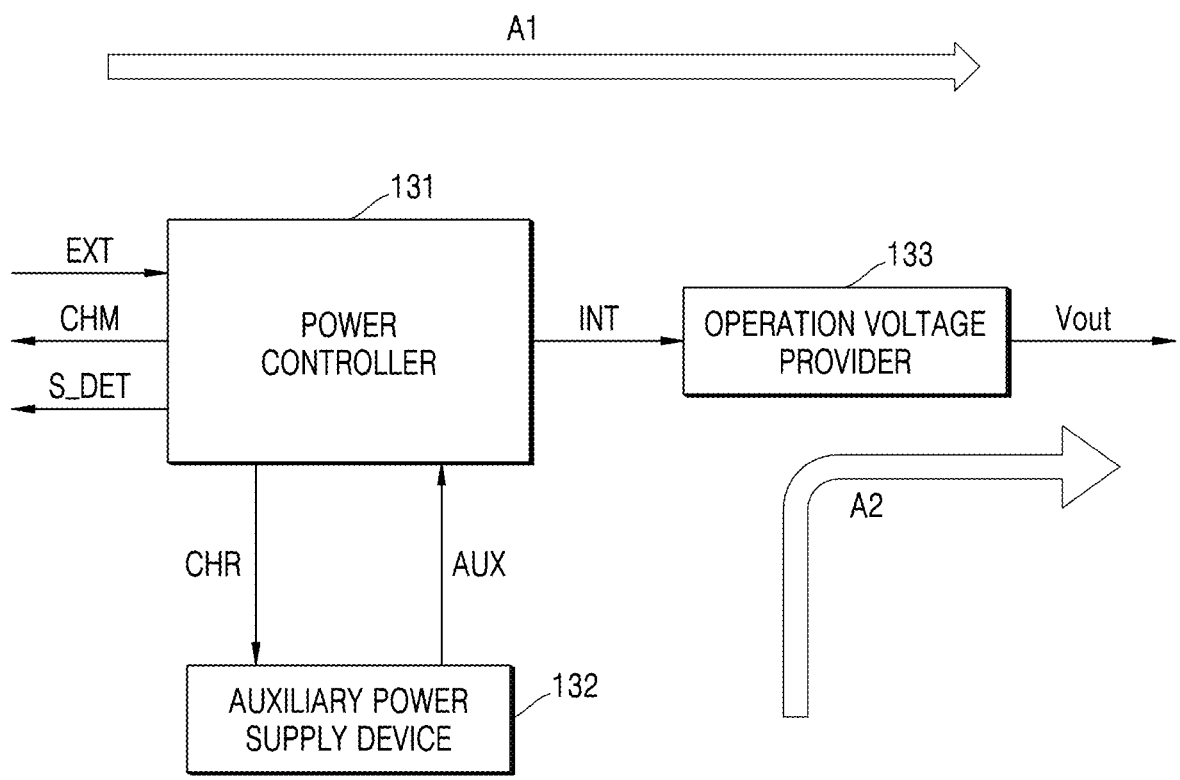
FIG. 3 is a block diagram illustrating a structure of a power supply device according to at least one embodiment of the inventive concepts.

FIG. 3 is a block diagram illustrating a structure of a power supply device according to at least one embodiment of the inventive concepts. In detail, FIG. 3 is a view for explaining the power supply device 130 of FIG. 1. Hereinafter, the power supply device 130 will be described with reference to FIGS. 1 and 2, and a description already given with reference to FIGS. 1 and 2 will be omitted.

Referring to FIG. 3, the power supply device 130 may include a power controller 131, an auxiliary power device 132, and an operating voltage provider 133.

The power controller 131 may control the overall operation of the power supply device 130. The power controller 131 may be a power loss protection integrated circuit (PLP IC), but is not limited thereto.

The power controller 131 may receive external power supply voltage EXT from the outside and convert the external power supply voltage EXT into internal power supply voltage INT having a constant voltage level. The external power supply voltage EXT input to the power controller 131 may be power applied from a host 2000 in FIG. 11, and the internal power supply voltage INT output from the power controller 131 may be converted to have a constant voltage level inside the power controller 131 and provided to the operating voltage provider 133.

The power controller 131 may monitor the voltage level of the external power supply voltage EXT, and when the voltage level of the external power supply voltage EXT falls below the initially set minimum allowable operation voltage level, the power controller 131 may detect that an SPO has occurred. The power controller 131 may activate the sudden power-off detection signal S_DET by detecting the sudden power-off and provide the activated sudden power-off detection signal S_DET to the controller 111 of FIG. 2.

The power controller 131 may operate in an external power supply mode or an auxiliary power supply mode based on the monitored voltage level of the external power supply voltage EXT. The controller 111 in FIG. 2 may control the power controller 131 to operate in the external power supply mode or the auxiliary power supply mode, based on the sudden power-off detection signal S_DET output from the power controller 131. For example, in some example embodiments, when a SPO has occurred, the power controller 131 may operate using the auxiliary power supply mode.

When external power supply voltage EXT is normally supplied to the power controller 131, the power controller 131 may deactivate the sudden power-off detection signal S_DET, and the controller 111 of FIG. 2 may control the power controller 131 to operate in the external power supply mode. Accordingly, the power controller 131 may allow the external power supply voltage EXT to be output as the internal power supply voltage INT and block electrical energy (e.g., an auxiliary power source AUX) charged in the auxiliary power supply device 132 from being output as the internal power source INT. For example, in the external power supply mode, as shown by the first arrow A1, the external power supply voltage EXT may be provided to the operating voltage provider 133 as the internal power supply voltage INT.

When the power controller 131 operates in the external power supply mode, the power controller 131 may provide the charging power CHR to the auxiliary power supply device 132 using the external power supply voltage EXT. For example, the power controller 131 may convert the external power supply voltage EXT to the charging power CHR for charging the auxiliary power supply device 132 and provide the charging power CHR to the auxiliary power supply device 132.

Hereinafter, the case in which the external power supply voltage EXT is normally supplied to the power controller 131 may refer to a case in which the voltage level of the external power supply voltage EXT is equal to or greater than the initially set minimum allowable operation voltage level. In addition, the case in which the external power supply voltage EXT is not normally supplied to the power controller 131 may refer to a case in which the voltage level of the external power supply voltage EXT is lowered to less than an initially set minimum allowable operation voltage level. For example, in an SPO situation, the external power supply voltage EXT may not be normally supplied to the power controller 131.

On the other hand, when the external power supply voltage EXT is not normally supplied to the power controller 131, the power controller 131 may activate the sudden power-off detection signal S_DET, and the controller 111 of FIG. 2 may control the power controller 131 to operate in the auxiliary power supply mode. In this case, the power controller 131 may block the external power supply voltage EXT from being output as the internal power supply voltage INT and allow electrical energy (e.g., an auxiliary power source AUX) charged in the auxiliary power supply device 132 to be output as the internal power source INT. For example, in the auxiliary power supply mode, as shown by the second arrow A2, the auxiliary power AUX provided from the auxiliary power supply device 132 may be supplied to the operating voltage provider 133 as the internal power supply voltage INT.

The power controller 131 may monitor the degree of deterioration of the auxiliary power supply device 132 in various ways. For example, the power controller 131 may monitor the degree of deterioration of the auxiliary power supply device 132 by using the time required for the auxiliary power supply device 132 to be discharged, the time required for the auxiliary power supply device 132 to be fully charged, the charging voltage of the auxiliary power supply device 132, and/or the like. Hereinafter, for convenience of description, it will be described that the degree of deterioration of the auxiliary power supply device 132 is monitored using the time required for the auxiliary power supply device 132 to be discharged, but an embodiment according to the inventive concept is not limited thereto.

The time required for the auxiliary power supply device 132 to be discharged may represent the amount of electric energy charged in the auxiliary power supply device 132. For example, as the auxiliary power supply device 132 deteriorates (as the electrical energy charged in the auxiliary power supply device 132 decreases), the time required for the auxiliary power supply device 132 to be discharged may be shortened. Accordingly, the power controller 131 may monitor the degree of deterioration of the auxiliary power supply device 132 by measuring the time required for the auxiliary power supply device 132 to be discharged.

The power controller 131 may generate a deterioration monitoring signal CHM based on a result of monitoring the degree of deterioration of the auxiliary power supply device 132. The power controller 131 may provide the deterioration monitoring signal CHM to the controller 111 of FIG. 2 continuously or at a predetermined (or otherwise determined) period. For example, the predetermined period may be a value set by a user. Alternatively, for example, the predetermined period may be determined based on a charging cycle of the auxiliary power supply device 132. The deterioration of the auxiliary power supply device 132 will be described in more detail with reference to FIG. 5 to be described later.

The auxiliary power supply device 132 may include one or more capacitors. The auxiliary power device 132 may store electrical energy using the charging power CHR supplied from the power controller 131. In addition, the auxiliary power supply device 132 may provide the electric energy stored in the auxiliary power supply device 132 to the power controller 131 as an auxiliary power source AUX. The power controller 131 may convert the auxiliary power source AUX so that the auxiliary power source AUX has a constant voltage level and provide the converted auxiliary power source to the operating voltage provider 133 as the internal power source INT. Accordingly, even when an SPO situation occurs, the storage device 100 of FIG. 1 may perform data backup and normally terminate the operation being performed.

Although the auxiliary power supply device 132 is illustrated as a separate block from the power controller 131 in FIG. 3, the example embodiments are not limited thereto, and the auxiliary power supply device 132 may be a component included in the power controller 131. The auxiliary power supply device 132 is described in more detail with reference to FIG. 4 to be described later.

The operating voltage provider 133 may receive internal power supply voltage INT from the power controller 131. The operating voltage provider 133 may generate various levels of operating voltages required for the main system 110 of FIG. 1 to operate by converting the voltage level of the internal power source INT. For example, the operating voltage provider 133 may convert the voltage level of the internal power supply INT so that voltages of various levels required for the operation of the controller 111 of FIG. 2 are generated. The operating voltage provider 133 may convert the voltage level of the internal power source INT so that voltages of various levels necessary for read, write, and erase operations of the first memory 112 of FIG. 2 and the second memory 113 of FIG. 2 are generated.

The operating voltage provider 133 may provide, for example, an output voltage Vout having an increased voltage level of the internal power source INT to a component that requires a voltage level higher than the voltage level of the provided internal power source INT and provide an output voltage Vout having a lowered voltage level of the provided internal power source INT to a component that requires a voltage level lower than the voltage level of the provided internal power source INT. The operating voltage provider 133 is described in more detail with reference to FIG. 6 to be described later.

Figure 4:
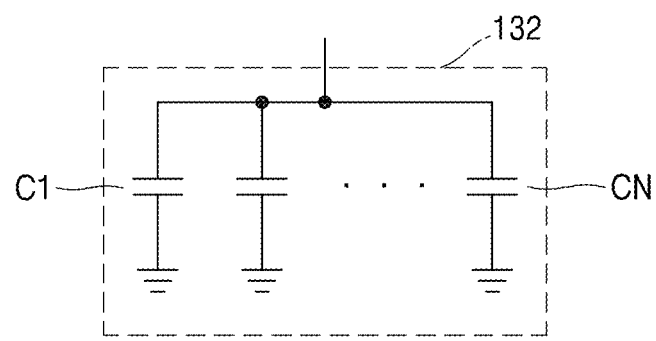
FIG. 4 is a circuit diagram illustrating an auxiliary power supply device according to at least one embodiment of the inventive concepts.

FIG. 4 is a circuit diagram illustrating an auxiliary power supply device according to embodiments of the inventive concept. In detail, FIG. 4 is a circuit diagram of the auxiliary power supply device 132 of FIG. 3. Hereinafter, the auxiliary power supply device is described with reference to FIGS. 1 to 3, and descriptions already given with reference to FIGS. 1 to 3 are omitted.

Referring to FIG. 4, the auxiliary power supply device 132 may include at least one capacitor, for example, capacitors C1 to CN. The auxiliary power supply device 132 may have a structure in which at least one capacitor C1 to CN is connected in parallel. The at least one capacitor C1 to CN may include a large-capacity capacitor, for example, a super capacitor. The super capacitor may be a power storage device capable of storing a large amount of electric charge. The at least one capacitor C1 to CN may include at least one of an electrolytic capacitor, a tantalum capacitor, a film capacitor, a ceramic capacitor, and/or the like.

For example, in the electrolytic capacitor, a thin oxide film may be used as a dielectric, and aluminum may be used as an electrode. The electrolytic capacitor has good low-frequency characteristics and may be implemented with a high capacity up to tens of thousands of μF. The tantalum capacitor may have an electrode formed of tantalum (Ta), and may have better temperature and frequency characteristics than an electrolytic capacitor. The film capacitor may have a structure in which a film dielectric, such as polypropylene, polystyrol, and Teflon, is placed between electrodes, such as aluminum and copper, and wound into a roll. Film capacitors may have different capacities and use depending on materials and manufacturing processes. For the ceramic capacitor, a material having a high dielectric constant, such as Titanium-Barium, may be used as a dielectric material. Ceramic capacitors have good high frequency characteristics and may be used to pass noise to the ground. A multi-layer ceramic capacitor (MLCC), which is a type of ceramic capacitor, may use a multi-layered high-k ceramic as a dielectric between electrodes. The MLCC has good temperature and frequency characteristics and may be widely used for bypass because of its small size.

At least one capacitor C1 to CN constituting the auxiliary power supply device 132 of the present embodiment may be formed of an aluminum capacitor, tantalum capacitors, or MLCCs, which have a low equivalent series resistance (ESR), but the example embodiments not limited thereto. As described above with reference to FIG. 3, the auxiliary power supply device 132 may be charged by charging power CHR of FIG. 3 provided through the power controller 131, and the charging power CHR of FIG. 3 may be provided based on external power supply voltage EXT of FIG. 3.

The charging operation of the capacitors C1 to CN may be repeatedly performed with a predetermined (or otherwise determined) cycle. For example, the auxiliary power supply device 132 may stop charging when the voltage level of the capacitors C1 to CN reaches the first voltage level V1 of FIG. 5. When charging is stopped, a natural discharge phenomenon may occur, in which charges are gradually discharged from the capacitors C1 to CN, accordingly, the voltage level of the capacitors C1 to CN may gradually decrease. As the natural discharge phenomenon occurs, the voltage level of the capacitors C1 to CN may reach a second voltage level V2 in FIG. 5 that is lower than the first voltage level V1 in FIG. 5, and the auxiliary power supply device 132 may perform charging again. Alternatively, as the supply of external power supply voltage EXT in FIG. 3 is stopped and auxiliary power AUX in FIG. 3 is used, the voltage level of the capacitors C1 to CN may reach a second voltage level V2 in FIG. 5 that is lower than the first voltage level V1 in FIG. 5, and when the supply of external power supply voltage EXT of FIG. 3 is resumed later, the auxiliary power supply device 132 may perform charging again. The first voltage level V1 in FIG. 5 and the second voltage level V2 in FIG. 5 may be preset (or otherwise set) values by a user.

Electrical energy stored in the auxiliary power supply device 132 may be calculated based on Equation 1 below.

$$E_{CAP} = \frac{1}{2}CV_{CHR^2} \qquad \text{[Equation 1]}$$

Herein, $E_{CAP}$ may be electrical energy stored in the auxiliary power supply device 132, C may be an equivalent capacitance of the auxiliary power supply device 132, and $V_{CHR}$ may be a charging voltage of the auxiliary power supply device 132. Hereinafter, 'capacitance of the auxiliary power supply device 132' may refer to the equivalent capacitance of at least one capacitor C1 to CN included in the auxiliary power supply device 132. The charging voltage $V_{CHR}$ of the auxiliary power supply may be a fixed constant value, and the capacitance of the capacitors C1 to CN may be a variable value.

According to Equation 1, as the auxiliary power supply device 132 deteriorates, the capacitance C of the auxiliary power supply device 132 may decrease. Accordingly, the electrical energy $E_{CAP}$ that the auxiliary power supply device 132 may provide to the power controller 131 of FIG. 3 may decrease, and in an SPO situation, the auxiliary power AUX of FIG. 3 necessary for the operation of the main system 110 of FIG. 1 may not be sufficiently supplied to the power controller 131 of FIG. 3.

Figure 5:
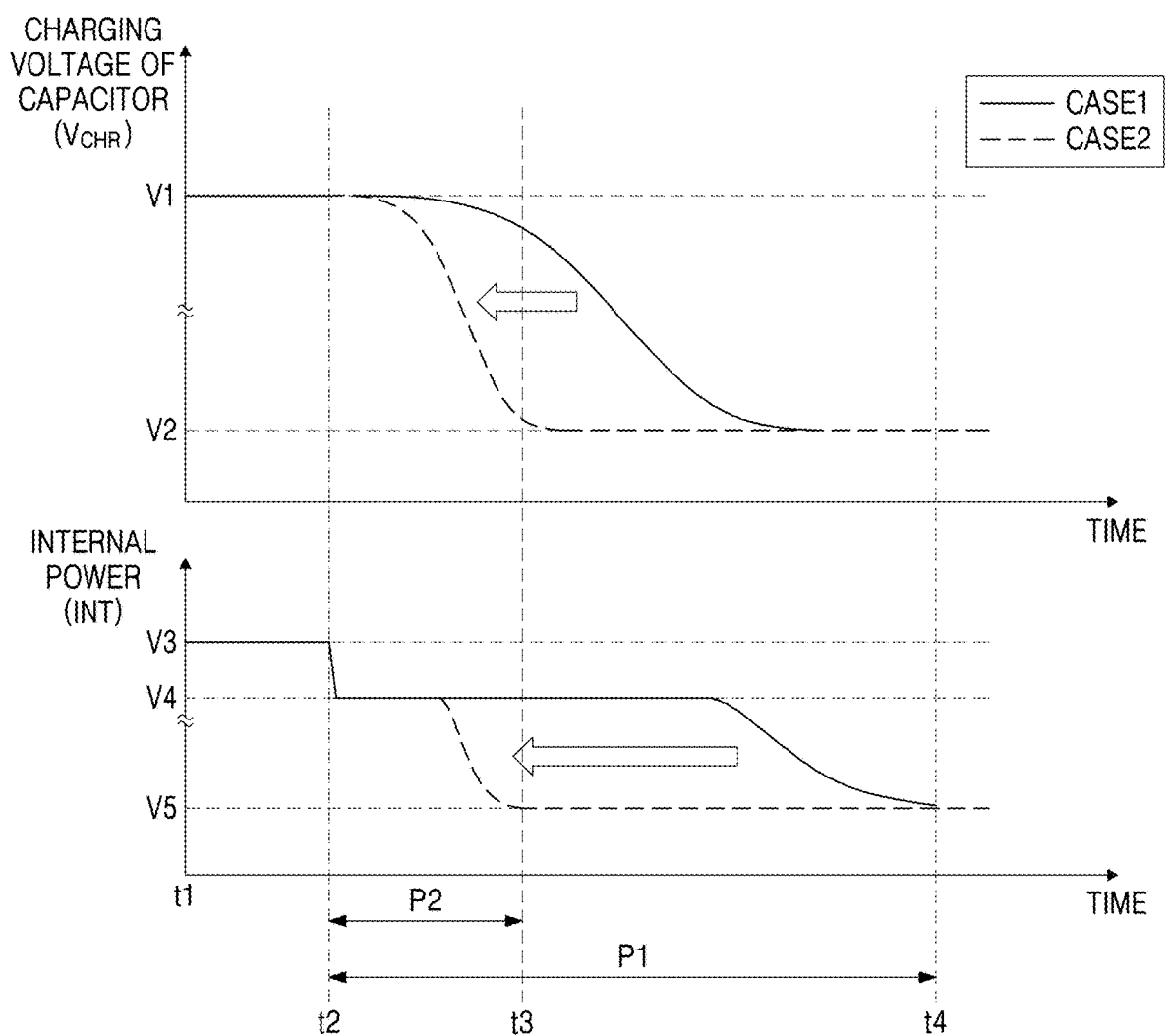
FIG. 5 is a diagram for explaining an operation of a power supply device according to at least one embodiment of the inventive concepts.

FIG. 5 is a diagram for explaining an operation of a power supply device according to some embodiments. In detail, FIG. 5 is a graph for explaining the operation of the power supply device 130 of FIG. 3. Hereinafter, it will be described with reference to FIGS. 1 to 4, and a description already given with reference to FIGS. 1 to 4 will be omitted.

Referring to FIG. 5, the first case CASE1 may represent a case in which the auxiliary power supply device 132 of FIG. 3 is not deteriorated, and the second case CASE2 may represent a case in which the auxiliary power supply device 132 of FIG. 3 is deteriorated and the degree of deterioration of the auxiliary power supply device 132 of FIG. 3 is equal to a preset (or otherwise set) 'reference value'. The reference value may represent a minimum value of an electric energy value that may ensure a dump operation of the main system 110 of FIG. 2 in an SPO situation. The arrow in FIG. 5 may indicate that as the first case CASE1 goes toward the second case CASE2, the auxiliary power supply device 132 in FIG. 3 deteriorates and electrical energy stored in the auxiliary power supply device 132 in FIG. 3 decreases.

At a first time point t1, external power supply voltage EXT of FIG. 3 may be normally supplied to the power supply device 130 of FIG. 3. Accordingly, the power supply device 130 in FIG. 3 may operate in the external power supply mode, and the internal power supply voltage INT output from the power controller 131 of FIG. 3 based on the external power supply voltage EXT of FIG. 3 may be output. In addition, because the auxiliary power supply device 132 of FIG. 3 may be charged based on the external power supply EXT of FIG. 3, the voltage levels of the charging voltage $V_{CHR}$ of the capacitor may be the first level V1 in both the first case CASE1 and the second case CASE2. In the external power supply mode, the voltage level of the internal power supply voltage INT output by the power controller 131 of FIG. 3 may be the third level V3. The third level V3 may be equal to or lower than the first level V1.

At the second time point t2, an SPO may occur. Accordingly, the power supply device 130 in FIG. 3 may operate in the auxiliary power supply mode, and the internal power supply voltage INT output from the power controller 131 of FIG. 3 may be output based on the auxiliary power AUX of FIG. 3. In addition, as the auxiliary power supply device 132 of FIG. 3 uses the auxiliary power supply AUX of FIG. 3, the voltage level of the charging voltage $V_{CHR}$ of the capacitor may start to decrease in the first case CASE1 and the second case CASE2. In the auxiliary power supply mode, the voltage level of the internal power supply voltage INT output by the power controller 131 of FIG. 3 may be the fourth level V4. The fourth level V4 may be lower than the third level V3 and higher than the second level V2.

At the third time point t3, the voltage level of the charging voltage $V_{CHR}$ of the capacitor in the second case CASE2 may become the second level V2. Accordingly, at the third time point t3, the auxiliary power supply device 132 in FIG. 3 of the second case CASE2 may be discharged, and the voltage level of the internal power supply voltage INT output by the power controller 131 of FIG. 3 may be the fifth level V5. At the fifth level V5, the storage device 100 of FIG. 1 may be turned off. For example, the fifth level V5 may be 0 V.

In the second case CASE2, a time required for the auxiliary power supply device 132 of FIG. 3 to be discharged may be the same as the second period P2. The second period P2 may represent the minimum value of electrical energy that may ensure the dump operation of the main system 110 of FIG. 2 in an SPO situation and be the 'reference value' described above with reference to FIGS. 1 to 3.

At the fourth time point t4, the voltage level of the charging voltage $V_{CHR}$ of the capacitor in the first case CASE1 may become the second level V2. Accordingly, at the fourth time point t4, the auxiliary power supply device 132 in FIG. 3 of the first case CASE1 may be discharged, and the voltage level of the internal power supply voltage INT output by the power controller 131 of FIG. 3 may be the fifth level V5. In the first case CASE1, a time required for the auxiliary power supply device 132 of FIG. 3 to be discharged may be the same as the first period P1. The first period P1 may be longer than the second period P2. For example, as the electrical energy charged in the auxiliary power supply device 132 of FIG. 3 decreases (as the auxiliary power supply device 132 of FIG. 3 deteriorates), the time required for the auxiliary power supply device 132 of FIG. 3 to be discharged may be shortened, and the supply time of the internal power supply voltage INT provided to the operating voltage provider 133 of FIG. 3 may also be shortened. Accordingly, the amount of energy provided to the main system 110 of FIG. 1 through the operating voltage provider 133 of FIG. 3 may be reduced.

According to some embodiments, even though the SPO occurs when the electric energy value stored in the auxiliary power supply device 132 of FIG. 3 (e.g., the time required for the auxiliary power supply to be discharged) is equal to or less than a reference value, for example, the second period P2, by converting the average voltage level of the output voltage Vout output from the operating voltage provider 133 of FIG. 3 to the DVS level, power consumed in the dump operation of the main system 110 of FIG. 2 may be reduced. Accordingly, the dump operation of the main system 110 of FIG. 2 may be guaranteed even if the electric energy value stored in the auxiliary power supply device 132 of FIG. 3 is equal to or less than the reference value. For example, the life expectancy of the storage device 100 may be extended.

In addition, at least some of the capacitors C1 to CN of FIG. 4 included in the auxiliary power supply device 132 of FIG. 4 may be omitted by reflecting the reduced power in the initial design of the storage device 100 of FIG. 1. Accordingly, the manufacturing cost of the storage device 100 of FIG. 1 may be reduced.

Figure 6:
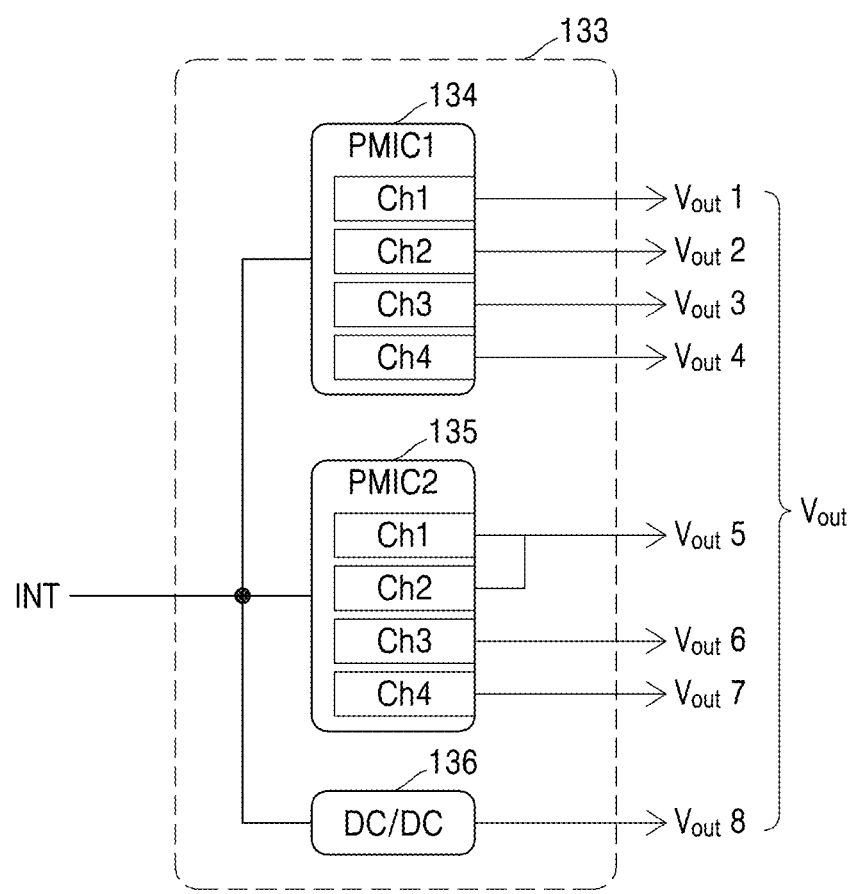
FIG. 6 is a block diagram illustrating a structure of an operating voltage provider according to at least one embodiment of the inventive concepts.

FIG. 6 is a block diagram illustrating a structure of an operating voltage provider according to some embodiments. In detail, FIG. 6 is a block diagram of the operating voltage provider 133 of FIG. 3. Hereinafter, it is described with reference to FIGS. 1 to 3, and descriptions already given with reference to FIGS. 1 to 3 are omitted.

Referring to FIG. 6, the operating voltage provider 133 may include one or more PMICs and a DC/DC converter. For example, the operating voltage provider 133 may include a first PMIC 134, a second PMIC 135, and a DC/DC converter 136. The operating voltage provider 133 illustrated in FIG. 6 is illustrated as including the first and second PMICs, but is not limited thereto, and the operating voltage provider 133 may include only one PMIC or three or more PMICs. In addition, although only one DC/DC converter 136 is shown in FIG. 6, the inventive concept is not limited thereto. The operating voltage provider 133 may include one or more DC/DC converters, and the DC/DC converters may be omitted.

The first PMIC 134 and the second PMIC 135 may provide an output voltage Vout corresponding to each of the components of the main system 110 of FIG. 2 under the control by the controller 111 of FIG. 2. FIG. 6 illustrates that the output voltage Vout includes the first to eighth output voltages Vout1 to Vout8, but this is only an example for explaining that the output voltage Vout may include output voltages having various voltage levels, and the example embodiments are not limited thereto. In addition, although not shown in FIG. 6, the first PMIC 134 and the second PMIC 135 generate an output voltage Vout corresponding to each of the components of the main system (110 of FIG. 2) and at the same time generate a clock signal corresponding to each of the components of the main system 110 of FIG. 2. The generated clock signal may be provided to a corresponding component together with the output voltage Vout.

The first PMIC 134 may generate first to fourth output voltages Vout1 to Vout4 provided to each component of the controller 111 in FIG. 2, based on the internal power source INT, and provide the first to fourth output voltages Vout1 to Vout4 respectively to corresponding components of the controller 111 of FIG. 2. Voltage levels of the first to fourth output voltages Vout1 to Vout4 may be the same as or different from each other. The first PMIC 134 of FIG. 6 is illustrated as generating the first to fourth output voltages Vout1 to Vout4, but embodiments according to the inventive concept are not limited thereto.

The second PMIC 135 may generate fifth to seventh output voltages Vout5 to Vout7 provided to the first memory 112 of FIG. 2 and the second memory 113 of FIG. 2, based on the internal power supply voltage INT, and provide the fifth to seventh output voltages Vout5 to Vout7 to corresponding components of the first memory 112 in FIG. 2 and the second memory 113 in FIG. 2. For example, the fifth and sixth output voltages Vout5 and Vout6 are provided to corresponding components of the second memory 113 of FIG. 2, and the seventh output voltage Vout7 may be provided to the first memory 112 of FIG. 2. Voltage levels of the fifth to seventh output voltages Vout5 to Vout7 may be the same as or different from each other. The second PMIC 135 of FIG. 6 is illustrated as generating fifth to seventh output voltages Vout5 to Vout7, but the example embodiments are not limited thereto.

The first PMIC 134 and the second PMIC 135 may adjust the voltage level of the output voltage Vout under the control by the controller 111 of FIG. 2. The first PMIC 134 and the second PMIC 135 may provide, block, and/or convert the voltage level of each of the output voltages Vout. For example, the first PMIC 134 and the second PMIC 135 may convert an average voltage level of each of the first to seventh output voltages Vout1 to Vout7 into a corresponding DVS level, based on the voltage scaling command VSC of FIG. 2. The DVS level may be a fixed value input by a user, or a value automatically calculated by a controller 111 in FIG. 2. The DVS level may be the same as or different from each other for each of the first to seventh output voltages Vout1 to Vout7. For example, the DVS level of the first output voltage Vout1 may be greater than the DVS level of the second output voltage Vout2.

The DC/DC converter 136 may adjust the eighth output voltage Vout8 provided to the second memory 113 of FIG. 2 under the control by the controller 111 of FIG. 2. The DC/DC converter 136 may provide, block, and/or convert the voltage level of the eighth output voltage Vout8. For example, the DC/DC converter 136 may convert the average voltage level of the eighth output voltage Vout8 into a corresponding DVS level based on the voltage scaling command VSC of FIG. 2. The DVS level may be a fixed value input by a user, or a value automatically calculated by the controller 111 in FIG. 2. The DVS level of the eighth output voltage Vout8 may be the same as or different from the first to seventh output voltages Vout1 to Vout7.

Figure 7:
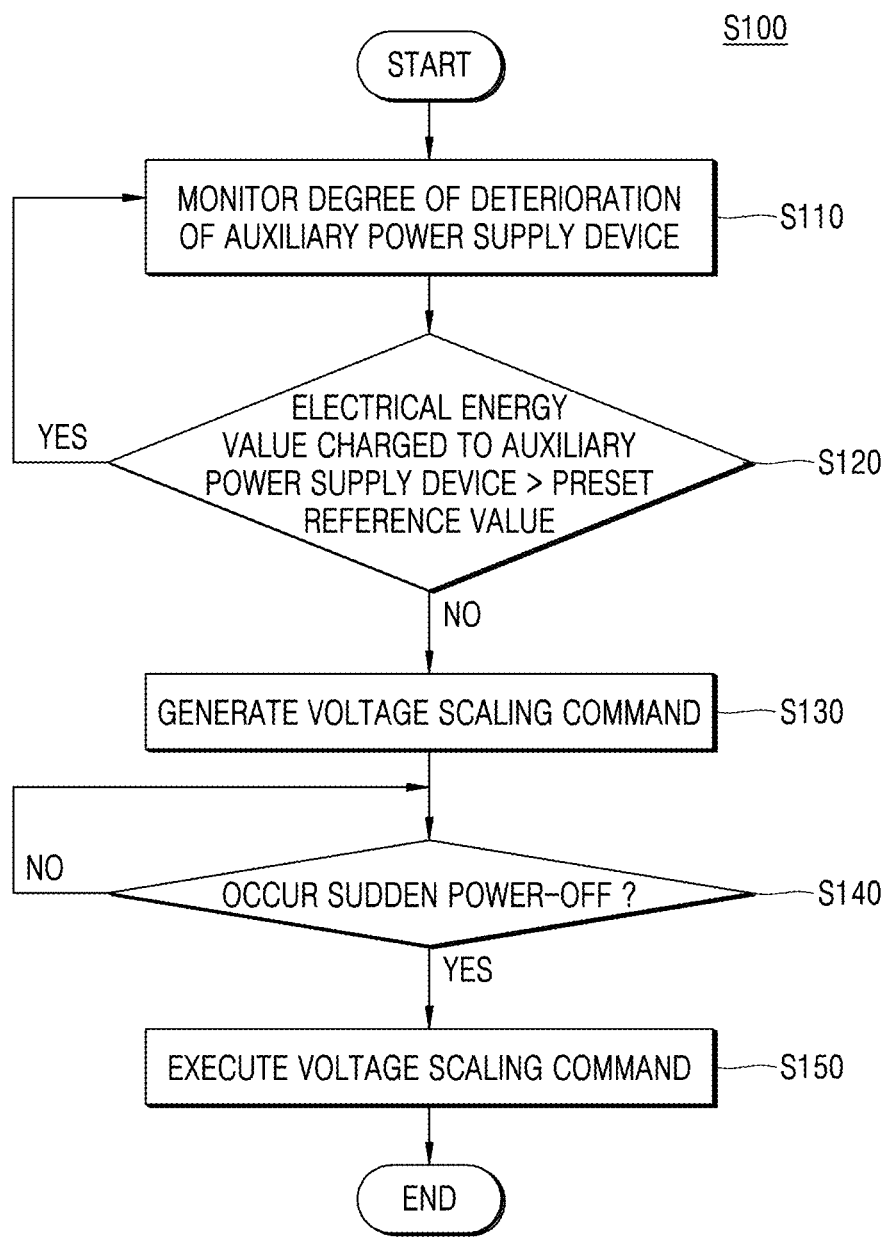
FIG. 7 is a flowchart illustrating an operation of a storage device according to at least one embodiment of the inventive concepts.

FIG. 7 is a flowchart illustrating an operation of a storage device according to some embodiments. In detail, FIG. 7 is a flowchart illustrating an operation method of the storage device 100 of FIG. 1. Hereinafter, it will be described with reference to FIGS. 1 to 6, and a description already given with reference to FIGS. 1 to 6 will be omitted.

Referring to FIG. 7, a method S100 of operating the storage device 100 may include operations S110, S120, S130, S140, and S150.

In operation S110, the power controller 131 of FIG. 3 may monitor the degree of deterioration of the auxiliary power supply device 132 of FIG. 3. The degree of deterioration of the auxiliary power supply device 132 of FIG. 3 may be monitored through electrical energy stored in the auxiliary power supply device 132 of FIG. 3. For example, as the auxiliary power supply device 132 of FIG. 3 deteriorates, the amount of electrical energy stored in the auxiliary power supply device 132 of FIG. 3 may decrease. Accordingly, the power controller 131 of FIG. 3 may monitor the degree of deterioration of the auxiliary power supply device 132 of FIG. 3 using a value that may represent the electrical energy stored in the auxiliary power supply device 132 of FIG. 3. For example, as described above with reference to FIGS. 4 and 5, the power controller 131 of FIG. 3 may monitor the degree of deterioration of the auxiliary power supply device 132 of FIG. 3 by measuring a time required for the auxiliary power supply device 132 of FIG. 3 to be discharged.

The power controller 131 of FIG. 3 may output a deterioration monitoring signal CHM of FIG. 3 continuously or at predetermined (or otherwise determined) period based on the result of monitoring the degree of deterioration of the auxiliary power supply device 132 of FIG. 3. The power controller 131 of FIG. 3 may provide a deterioration monitoring signal CHM of FIG. 3 to the controller 111 of FIG. 2.

In operation S120, the controller 111 of FIG. 2 may receive a deterioration monitoring signal CHM of FIG. 2. The firmware 114 of FIG. 2 may compare the degree of deterioration of the auxiliary power supply device 132 of FIG. 3 with a reference value based on the deterioration monitoring signal CHM of FIG. 2. For example, the firmware 114 of FIG. 2 may compare the electrical energy stored in the auxiliary power supply device 132 of FIG. 3 with a reference value based on the deterioration monitoring signal CHM of FIG. 2. For example, the firmware 114 of FIG. 2 may compare the time required for the auxiliary power supply device 132 of FIG. 3 to be discharged with a reference value (e.g., the second period P2 of FIG. 5). The reference value may be a value representing the minimum electrical energy that may ensure the dump operation of the main system 110 of FIG. 2 in an SPO situation. The reference value may be a value input by a user. The reference value may be set to various values depending on the configuration of the storage device 100 of FIG. 1.

When the electrical energy stored in the auxiliary power supply device 132 in FIG. 3 is greater than the reference value, the firmware 114 of FIG. 2 may determine that the degree of deterioration of the auxiliary power supply device 132 of FIG. 3 is at a level that may ensure the dump operation of the main system 110 of FIG. 2 in an SPO situation. Accordingly, operation S110 may be repeated.

When the electrical energy stored in the auxiliary power device 132 in FIG. 3 is equal to or less than the reference value, the firmware 114 of FIG. 2 may determine that the degree of deterioration of the auxiliary power supply device 132 of FIG. 3 is at a level at which it is difficult to guarantee the dump operation of the main system 110 of FIG. 2 in an SPO situation. Accordingly, operation S130 may be performed.

In operation S130, the controller 111 of FIG. 2 may generate the voltage scaling command VSC of FIG. 2 that converts the voltage level of the output voltage Vout of FIG. 2. The voltage scaling command VSC of FIG. 2 may be a command for converting the average voltage level of the output voltage Vout of FIG. 2 to the DVS level. The DVS level may be a minimum voltage level of the output voltage Vout of FIG. 2 such that and/or required to normally terminate the operation after the main system 110 of FIG. 2 performs a dump operation in an SPO situation. The DVS level may be a fixed value input by a user or a value automatically calculated by firmware 114 in FIG. 2. The voltage scaling command VSC of FIG. 2 may be stored in the first memory 112 of FIG. 2.

In operation S140, the power controller 131 of FIG. 3 may detect an SPO when the voltage level of the external power source EXT of FIG. 3 is lowered to less than an initially set minimum allowable operation voltage level. The power controller 131 of FIG. 3 may activate a sudden power-off detection signal S_DET of FIG. 3 upon detecting the sudden power-off, and may provide the activated sudden power-off detection signal S_DET of FIG. 3 to the controller 111 of FIG. 2.

In operation S150, the controller 111 in FIG. 2 may executes the voltage scaling command VSC of FIG. 2 stored in the first memory 112 of FIG. 2 in response to the sudden power-off detection signal S_DET of FIG. 2. Accordingly, the operating voltage provider 133 of FIG. 3 may convert the average voltage level of the output voltage Vout of FIG. 2 into a DVS level. In addition, the controller 111 of FIG. 2 may control the power supply device 130 of FIG. 3 to operate in the auxiliary power supply mode, in response to the sudden power-off detection signal S_DET of FIG. 2, and may control the main system 110 of FIG. 2 to perform a dump operation.

According to at least one embodiment of the inventive concepts, as the average voltage level of the output voltage Vout in FIG. 3 is converted to the DVS level, in an SPO situation, the power consumed in order for the main system 110 of FIG. 2 to perform a dump operation and to shut down the system stably may be saved. Accordingly, even though the electrical energy stored in the auxiliary power supply device 132 of FIG. 3 is insufficient for the main system 110 of FIG. 2 to perform a dump operation and stably shut down the system due to the deterioration of the auxiliary power supply device 132, the dump operation of the storage device 100 of FIG. 1 may be guaranteed.

In addition, at least some of the capacitors C1 to CN of FIG. 4 included in the auxiliary power supply device 132 of FIG. 4 may be omitted by reflecting the saved power in the initial design of the storage device 100 of FIG. 1. Accordingly, the manufacturing cost of the storage device 100 of FIG. 1 may be reduced. Hereinafter, a method of generating the voltage scaling command VSC is described in more detail with reference to FIGS. 8 to 10.

Figure 8:
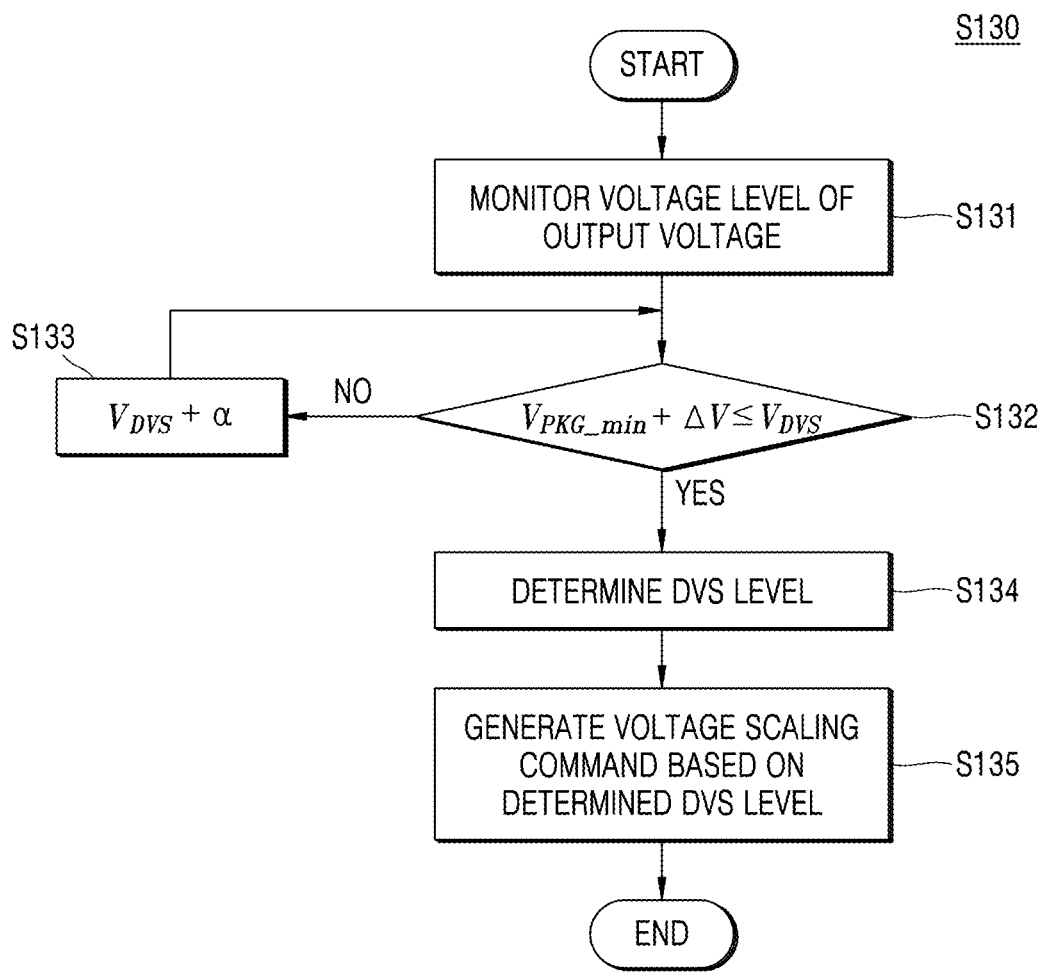
FIG. 8 is a flowchart illustrating an operation of a storage device according to at least one embodiment of the inventive concepts.

FIG. 8 is a flowchart illustrating a method of generating a voltage scaling command according to some example embodiments. In detail, FIG. 8 is an embodiment of operation S130 of FIG. 7, and is a diagram for explaining an operation in which the firmware 114 determines a DVS level by the first method or the second method described in FIG. 2. Hereinafter, it will be described with reference to FIGS. 1 to 7, and a description already given with reference to FIGS. 1 to 7 will be omitted.

Referring to FIG. 8, operation S130 may include operations S131, S132, S133, S134, and S135.

In operation S131, the ADC 115 of FIG. 2 may monitor the voltage level of the output voltage Vout of FIG. 2. The voltage level of the output voltage Vout of FIG. 2 may vary depending on an operating state (e.g., changes in temperature, humidity, and amount of power consumed during operation) of the storage device 100 of FIG. 1. The firmware 114 of FIG. 2 may extract a minimum voltage level and a maximum voltage level of the output voltage Vout in FIG. 2 using the output voltage Vout of FIG. 2 monitored by the ADC 115 in FIG. 2.

In operation S132, the firmware 114 of FIG. 2 may determine the DVS level based on the minimum voltage level and the maximum voltage level of the output voltage Vout of FIG. 2. First, the firmware 114 in FIG. 2 may calculate a delta value of the output voltage Vout in FIG. 2 using Equation 2 below.

$$\Delta V = \frac{V_{out\_max} - V_{out\_min}}{2} \quad \text{[Equation 2]}$$

ΔV may be a delta value of the output voltage, Vout_max may be a maximum voltage level of the output voltage, and Vout_min may be a minimum voltage level of the output voltage. For example, ΔV may mean the amount of change of the output voltage.

In addition, the firmware 114 of FIG. 2 may calculate the DVS level using the calculated delta value ΔV of the output voltage. The DVS level may be determined by Equation 3 below.

$$V_{PKG\_min} + \Delta V \leq V_{DVS} \quad \text{[Equation 3]}$$

Here, $V_{PKG\_min}$ is a limit voltage level of the output voltage Vout in FIG. 2 determined in the design stage so that the main system 110 in FIG. 2 may stably operate, and hereinafter, may be referred to as a 'spec level'. The spec level $V_{PKG\_min}$ may be determined in consideration of reliability of the storage device 100 of FIG. 1. The spec level $V_{PKG\_min}$ may be a minimum voltage level that the output voltage Vout of FIG. 2 may have. The spec level $V_{PKG\_min}$ may be determined differently depending on a configuration in which an output voltage is provided. For example, the spec level $V_{PKG\_min}$ of the output voltage (e.g., the first output voltage Vout1 of FIG. 6) provided to the controller may be different from the spec level $V_{PKG\_min}$ of the output voltage (e.g., the fifth output voltage Vout5 of FIG. 6) provided to the second memory.

The $V_{DVS}$ may be the DVS level of the output voltage Vout in FIG. 2. The DVS level $V_{DVS}$ may be determined to be equal to or greater than the sum of the spec level $V_{PKG\_min}$ and the delta value ΔV of the output voltage. The DVS level $V_{DVS}$ may be an average value of the converted output voltage.

In another embodiment, the delta value ΔV of the output voltage may be a preset (or otherwise set) value. For example, the delta value ΔV of the output voltage may be a value input by a user, not a value calculated by the firmware 114 in FIG. 2 using Equation 2 above. In this case, the DVS level $V_{DVS}$ may be determined using the preset (or otherwise set) delta value ΔV of the output voltage and Equation 3. For example, the DVS level $V_{DVS}$ may be determined as a value equal to or greater than the sum of the preset (or otherwise set) delta value ΔV and the specification level $V_{PKG\_min}$.

In operation S133, when the DVS level $V_{DVS}$ is less than the sum of the spec level $V_{PKG\_min}$ and the delta value ΔV of the output voltage, the firmware 114 in FIG. 2 sets the DVS level $V_{DVS}$ such that the output voltage may be increased by a first value α. The first value α may be a value input by a user. The first value α may be a value arbitrarily determined by the firmware 114 in FIG. 2. For example, the first value α may be 0.01V.

In operation S134, when the DVS level $V_{DVS}$ is equal to or greater than the sum of the spec level $V_{PKG\_min}$ and the delta value ΔV of the output voltage, the firmware 114 of FIG. 2 may determine the DVS level $V_{DVS}$ of the output voltage.

In operation S135, the firmware 114 of FIG. 2 may generate a voltage scaling command based on the determined DVS level $V_{DVS}$. The firmware 114 of FIG. 2 may store the generated voltage scaling command in the first memory 112 of FIG. 2.

Figure 9:
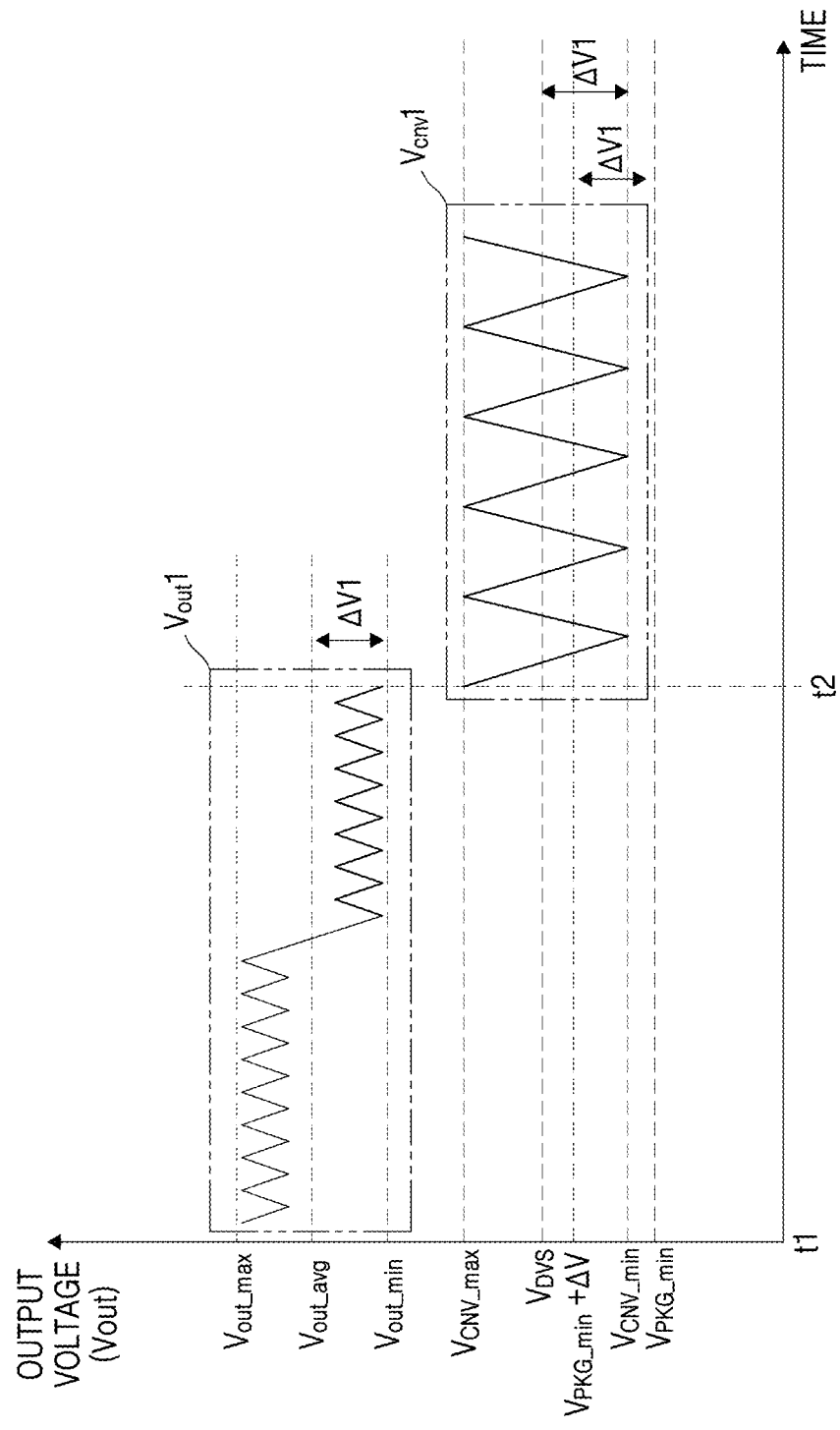
FIG. 9 is a diagram for explaining an output voltage according to at least one embodiment of the inventive concepts.

FIG. 9 is a diagram for explaining an output voltage according to some example embodiments. In detail, FIG. 9 is a view for explaining an operation of converting an average voltage level of the output voltage Vout to a DVS level by the first method described above in FIG. 2. Hereinafter, it will be described with reference to FIGS. 1 to 8, and a description already given with reference to FIGS. 1 to 8 will be omitted.

In FIG. 9, for convenience of explanation, a method of converting the average voltage level of the first output voltage Vout1 among the first to eighth output voltages Vout1 to Vout8 included in the output voltage Vout of FIG. 6 into a DVS level is described, but the inventive concept is not limited thereto, and the second to eighth output voltages Vout2 to Vout8 may also be converted to the DVS level in the same way as described below. The DVS level of each output voltage may be determined to be the same as or different from each other.

Referring to FIG. 9, the first time point t1 may correspond to operation S130 of FIG. 7. Accordingly, at the first time point t1, the electrical energy charged in the auxiliary power supply device 132 of FIG. 1 may be less than a preset (or otherwise set) reference value, and the firmware 114 of FIG. 2 may generate a voltage scaling command.

At a first time point t1, the ADC 115 of FIG. 2 may monitor the voltage level of the first output voltage Vout1 output from the first PMIC 134 of FIG. 6. The voltage level of the first output voltage Vout1 may vary depending on an operating condition of the storage device 100 of FIG. 1 (e.g., change in temperature, humidity, amount of power consumed during operation, etc.). Accordingly, the first output voltage Vout1 may include a minimum voltage level Vout_min and a maximum voltage level Vout_max.

The firmware 114 of FIG. 2 may calculate a first delta value ΔV1 using Equation 2, the minimum voltage level Vout_min of the first output voltage, and the maximum voltage level Vout_max of the first output voltage. The first delta value ΔV1 may be a change amount between the minimum voltage level Vout_min (or the maximum voltage level Vout_max) of the first output voltage and the average voltage level Vout_avg of the first output voltage.

The firmware 114 of FIG. 2 may determine the DVS level $V_{DVS}$ by using the first delta value ΔV1 calculated depending on the monitoring result of the ADC 115 of FIG. 2. The DVS level $V_{DVS}$ may be determined using Equation 3 described above. For example, the DVS level $V_{DVS}$ may be determined as a sum of the spec level $V_{PKG\_min}$ of the first output voltage at which the controller 111 of FIG. 2 may stably operate and the first delta value ΔV1 or a greater value than the sum.

The DVS level $V_{DVS}$ may be an average voltage level of the converted first output voltage Vcnv1. For example, the converted first output voltage Vcnv1 may have a variable voltage level like the first output voltage Vout1, and may include a minimum voltage level $V_{CNV\_min}$ and a maximum voltage level $V_{CNV\_max}$. The determined DVS level $V_{DVS}$ and the generated voltage scaling command VSC of FIG. 2 may be stored in the first memory 112 of FIG. 2.

A second time point t2 may correspond to operations S140 and S150 of FIG. 7. An SPO may occur at the second time point t2, and the voltage scaling command VSC of FIG. 2 stored in the first memory 112 of FIG. 2 may be executed. Accordingly, the first PMIC 134 of FIG. 6 may convert the average voltage level Vout_avg of the first output voltage Vout1 to the DVS level $V_{DVS}$, and may output the converted first output voltage Vcnv1 from the second time point t2. The controller 111 of FIG. 2 may operate based on the converted first output voltage Vcnv1.

Figure 10:
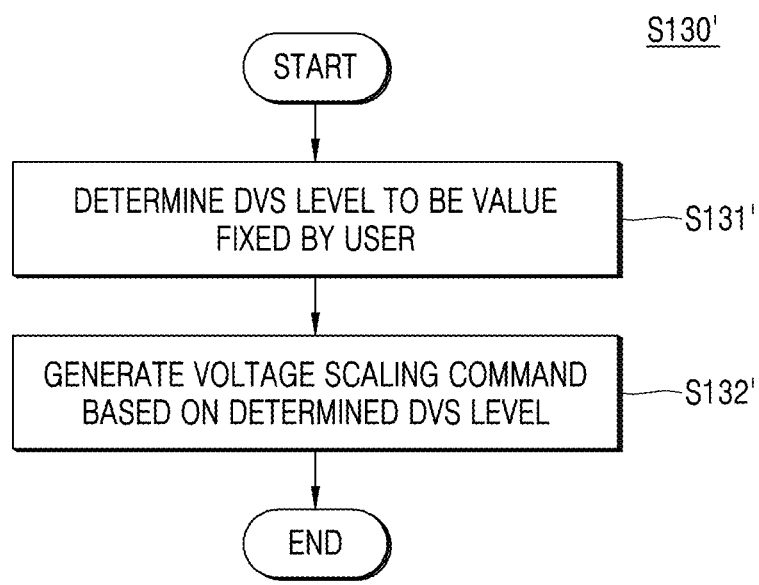
FIG. 10 is a flowchart illustrating an operation of a storage device according to at least one embodiment of the inventive concepts.

FIG. 10 is a flowchart illustrating a method for generating a voltage scaling command according to some example embodiments. In detail, FIG. 10 is another embodiment of operation S130 of FIG. 7, and is a diagram for explaining an operation in which the firmware 114 of FIG. 2 determines the DVS level by the third method described above in FIG. 2. Hereinafter, it will be described with reference to FIGS. 1 to 7 and the description already given with reference to FIGS. 1 to 7 will be omitted.

Referring to FIG. 10, operation S130' may include operations S131' and S132'. Operation S130' may correspond to operation S130 of FIG. 7.

In operation S131", a user may set the firmware 114 in FIG. 2 to determine the DVS level as a fixed value. When the firmware 114 in FIG. 2 determines the DVS level to be a fixed value, the voltage level of the output voltage Vout of FIG. 2 may be determined as a DVS level regardless of the surrounding conditions such as the amount of power consumed in real time while the main system 110 of FIG. 2 is operating and the external environment. In this case, the user may input a fixed value determined as the DVS level. The fixed value may be equal to or greater than the minimum voltage level of the output voltage Vout of FIG. 2 for the main system 110 of FIG. 2 to stably operate in an SPO situation.

In operation S132", the firmware 114 of FIG. 2 may generate a voltage scaling command based on a fixed value input by the user. The firmware 114 of FIG. 2 may store the generated voltage scaling command in the first memory 112 of FIG. 2.

Figure 11:
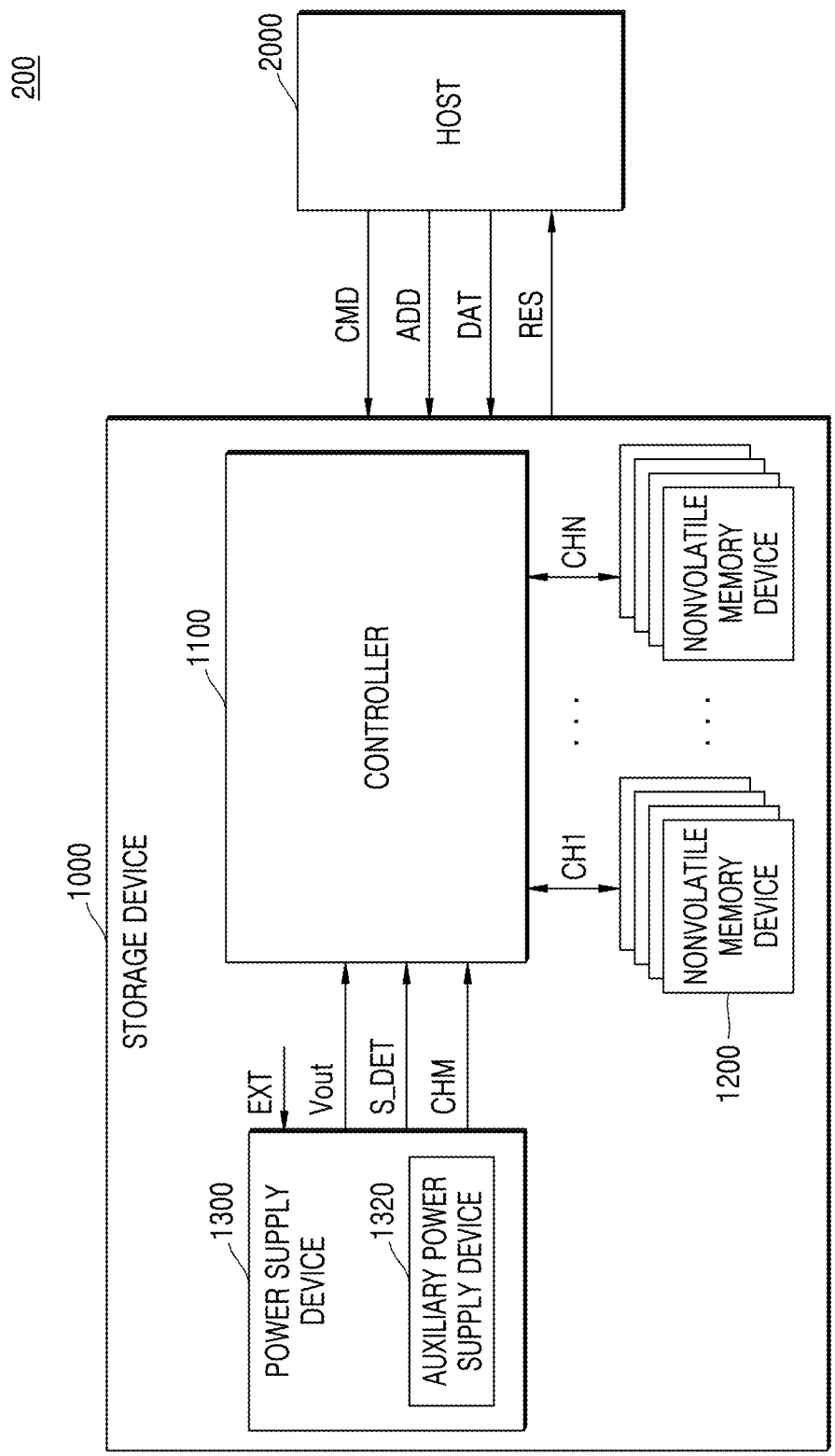
FIG. 11 is a block diagram illustrating a storage system including a storage device according to an example embodiment.

FIG. 11 is a block diagram illustrating a storage system including a storage device according to some example embodiments.

Referring to FIG. 11, the storage system 200 may include a storage device 1000 and a host 2000. The storage device 1000 may service data in response to a request from the host 2000. For example, the storage device 1000 may store data provided from the host 2000 or provide data stored in the storage device 1000 to the host 2000.

The storage device 1000 may include the storage device 100 of FIG. 1. The storage device 1000 may include a solid state drive (SSD). The storage device 1000 may include a controller 1100, a plurality of nonvolatile memory devices 1200, and a power supply device 1300.

The controller 1100 may transmit/receive a signal to/from the host 2000. Here, the signal may include a command CMD, an address ADD, and data DAT. For example, the command CMD may include a write command for writing data to the storage device 1000 and a read command for reading data stored in the storage device 1000. For example, the controller 1100 may receive a write command and a read command from the host 2000.

The controller 1100 may control the overall operation of the storage device 1000 based on a signal received from the host 2000. The controller 1100 may control firmware or software for driving the storage device 1000 based on the command CMD received from the host 2000. For example, when the command CMD provided from the host 2000 is the write command, the controller 1100 may control the storage device 1000 to write data by processing the write command. For example, when the command CMD provided from the host 2000 is the read command, the controller 1100 may control the storage device 1000 to read data by processing the read command.

The controller 1100 may receive an output voltage Vout from the power supply device 1300. The output voltage Vout may be a voltage required for the controller 1100 and the plurality of nonvolatile memory devices 1200 to operate. The output voltage Vout may be output to a plurality of channels, and the output voltage Vout output from each channel may have different voltage levels.

The controller 1100 may receive a sudden power-off detection signal S_DET from the power supply device 1300, and may control the power supply device 1300 to operate in the external power supply mode or the auxiliary power supply mode, in response to the sudden power off detection signal S_DET. In addition, the controller 1100 may control the operation of the nonvolatile memory device 1200 so that the nonvolatile memory device 1200 performs a dump operation in an SPO situation.

The controller 1100 may receive a deterioration monitoring signal CHM from the power supply device 1300, and may control the voltage level of the output voltage Vout output from the power supply device 1300 in response to the deterioration monitoring signal CHM. For example, the controller 1100 may generate a voltage scaling command for converting the average voltage level of the output voltage Vout output from the power supply device 1300 to a DVS level, in response to the deterioration monitoring signal CHM.

The controller 1100 may generate a response signal RES according to an operation and transmit the generated response signal RES to the host 2000. The response signal RES may refer to a signal generated based on a result of the controller 1100 processing the operation of the storage device 1000 in response to the command CMD. The controller 1100 may provide the response signal RES to the host 2000.

The nonvolatile memory devices 1200 may be used as a storage medium of the storage device 1000. The nonvolatile memory devices 1200 may include a NAND flash memory device, but the example embodiments not limited thereto. Although not shown, the nonvolatile memory devices 1200 may include a memory cell array, a write/read circuit, and control logic. The nonvolatile memory devices 1200 may include the second memory 113 of FIG. 2.

The power supply device 1300 may process the external power applied from the outside (EXT) or the auxiliary power applied from the auxiliary power device 1320 to provide the processed power to the storage device 1000. The power supply device 1300 may detect an SPO by monitoring the voltage level of the external power supply voltage EXT. When the SPO occurs, the power supply device 1300 may activate the sudden power-off detection signal S_DET and output the activated sudden power-off detection signal S_DET to the controller 1100. The power supply device 1300 may include the power supply device 130 of FIG. 3. The power supply device 1300 may include an auxiliary power supply device 1320.

The power supply device 1300 may monitor the degree of deterioration of the auxiliary power supply device 1320. The power supply device 1300 may generate the deterioration monitoring signal CHM based on a result of monitoring the degree of deterioration of the auxiliary power 1320, the controller 1100 may control the voltage level of the output voltage Vout in response to the deterioration monitoring signal CHM.

The host 2000 may be configured in the form of a board such as a printed circuit board. Although not shown in FIG. 11, the host 2000 may include background function blocks for generating and processing a control signal. The host 2000 may include a connection terminal (not shown) such as a socket, a slot, or a connector for transmitting and receiving signals to and from the storage device 1000, and the storage device 1000 may be mounted on a connection terminal of the host 2000. The host 2000 and the storage device 1000 may transmit signals such as commands, addresses, and data through connection terminals. The connection terminal may be configured in various forms based on an interface method between the host 2000 and the storage device 1000.

Hereinafter, the controller 1100 will be described in more detail with reference to FIG. 12.

Figure 12:
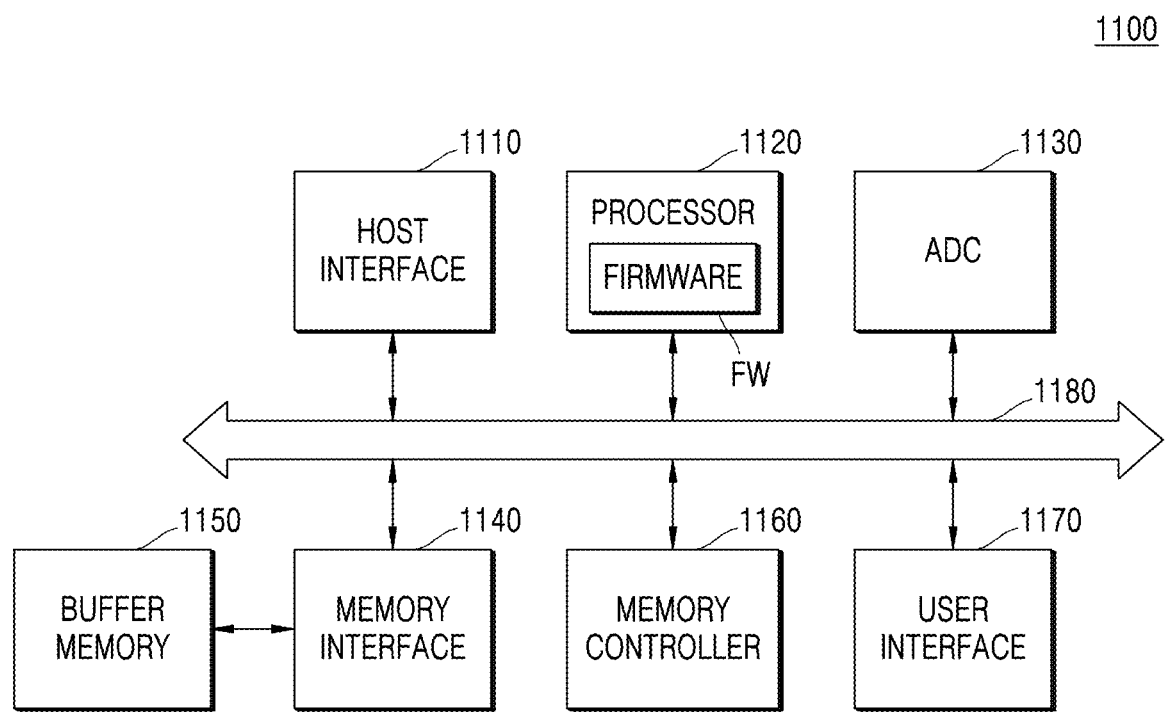
FIG. 12 is a block diagram illustrating a controller according to at least one embodiment of the inventive concepts.

FIG. 12 is a block diagram illustrating a controller according to some example embodiments. In detail, FIG. 12 is a diagram for explaining the controller 1100 of FIG. 11. Hereinafter, the controller 1100 is described with reference to FIG. 11, and the description already given with reference to FIG. 11 will be omitted.

Referring to FIG. 12, the controller 1100 may include a host interface 1110, a processor 1120, an ADC 1130, a memory interface 1140, a buffer memory 1150, a memory controller 1160, a user interface 1170, and a bus 1180.

The host interface 1110 may control an interface operation between the storage device 1000 of FIG. 11 and the host 2000 of FIG. 11. The host interface 1110 may interconnect the storage device 1000 of FIG. 11 and the host 2000 of FIG. 11 connected to the storage device 1000 of FIG. 11, and may include a data exchange protocol between the storage device 1000 in FIG. 11 and the host 2000 in FIG. 11. The host interface 1110 may be a serial advanced technology attachment (SATA) interface, a parallel advanced technology attachment (PATA) interface, a universal serial bus (USB) or serial attached small computer system (SAS) interface, PCI-express (PCI-E), or a nonvolatile memory-express (NVMe) interface. However, the example embodiments are not limited thereto.

The processor 1120 may analyze a signal input to the storage device 1000 of FIG. 11 and process an operation based on the analyzed result. The processor 1120 may control operations, such as reading, writing, and erasing data of the buffer memory 1150 and the nonvolatile memory device 1200 of FIG. 11. The processor 1120 may include an MCU or a CPU. The processor 1120 may be a component included in the controller 111 of FIG. 2.

The processor 1120 may control the overall operation of the storage device 1000 of FIG. 11 using firmware FW. The firmware FW may refer to software, an application, etc. that process data in response to a user's input. The processor 1120 may execute the firmware FW to control the nonvolatile memory devices 1200 of FIG. 11 and the power supply device 1300 of FIG. 11. The firmware FW is described as being executed in the processor 1120, but is not limited thereto, and the firmware FW may be executed in the buffer memory 1150 or may be executed in another block configuration.

The processor 1120 may command to temporarily store data read from the nonvolatile memory devices 1200 in FIG. 11 in the buffer memory 1150 before providing the data to the host 2000 in FIG. 11. In addition, the processor 1120 may command to temporarily store data requested by the host 2000 of FIG. 11 to write to the nonvolatile memory devices 1200 of FIG. 11 in the buffer memory 1150 before writing the data to the nonvolatile memory devices 1200 of FIG. 11. In this case, the data provided to the host 2000 of FIG. 11 or data provided from the host 2000 in FIG. 11 may include data executed by the application and metadata of the host 2000 of FIG. 11 for managing data.

In response to the sudden power-off detection signal S_DET in FIG. 11 received from the power supply device 1300 of FIG. 11, the processor may control the power supply device 1300 of FIG. 11 so that the power supply device 1300 of FIG. 11 operates in an external power supply mode or an auxiliary power supply mode. The processor 1120 may control the nonvolatile memory devices 1200 of FIG. 11 so that the nonvolatile memory devices 1200 of FIG. 11 perform a dump operation, based on the sudden power-off detection signal S_DET of FIG. 11 received from the power supply device 1300 in FIG. 11.

The firmware FW may correspond to the firmware 114 of FIG. 2. The firmware FW may generate a voltage scaling command like the firmware 114 of FIG. 2. The firmware FW may store the generated voltage scaling command in the buffer memory 1150. The firmware FW may execute the voltage scaling command stored in the buffer memory 1150 based on the sudden power-off detection signal S_DET of FIG. 11 received from the power supply device 1300 of FIG. 11.

The memory interface 1140 may write data to the buffer memory 1150 or read data stored in the buffer memory 1150 under the control by the processor 1120. The memory interface 1140 may write a voltage scaling command to the buffer memory 1150 or read a voltage scaling command stored in the buffer memory 1150 under the control by the processor 1120. The memory interface 1140 may manage buffer allocation unit (BAU) that manages the buffer and the use and release of the buffer.

The buffer memory 1150 may be used as a data storage medium of the controller 1100. The buffer memory 1150 may temporarily store data input/output to/from the nonvolatile memory devices 1200 of FIG. 11 or the controller 1100. The buffer memory 1150 may temporarily store a voltage scaling command generated from the firmware FW. Data temporarily stored in the buffer memory 1150 may be transmitted to the host 2000 of FIG. 11 or the nonvolatile memory devices 1200 under the control by the controller 1100. The buffer memory 1150 may include a volatile memory. For example, the buffer memory 1150 may include at least one of static random access memory (SRAM) and dynamic RAM (DRAM). The buffer memory 1150 may correspond to the first memory 112 of FIG. 2.

The memory controller 1160 may control operations of the nonvolatile memory devices 1200 of FIG. 11. The memory controller 1160 may exchange commands, addresses, data, etc. with the nonvolatile memory devices 1200 of FIG. 11. For example, the memory controller 1160 may transmit a signal received from the host interface 1110 to the nonvolatile memory devices 1200 of FIG. 11 during a write operation, and may transmit a signal read from the nonvolatile memory devices 1200 of FIG. 11 to the host interface 1110 during a read operation.

The user interface 1170 may include an input interface through which a user may access the storage device 1000 of FIG. 11 and an output interface capable of providing a user with an operation status or processing result of the storage device 1000 of FIG. 11. A user may input a reference value of electrical energy through the user interface 1170. The reference value may be a value compared with an electric energy value charged in the auxiliary power supply device 1320 of FIG. 11 in the firmware FW. The reference value may be a minimum electrical energy value at which the storage device 1000 of FIG. 11 may normally terminate an operation even when an SPO occurs after the auxiliary power device 1320 of FIG. 11 is deteriorated.

A user may input a DVS level determination method through the user interface 1170. For example, the user may set the firmware (FW) to determine the DVS level as a fixed value or a value automatically determined by the firmware (FW) through the user interface 1170. When the firmware FW determines the DVS level to be the fixed value, the DVS level may be determined regardless of the operating environment of the storage device 1000 of FIG. 11. In this case, the user may input a fixed value determined as the DVS level through the user interface 1170. The fixed value may be a value greater than the spec level of the output voltage Vout for the controller 1100 and the nonvolatile memory devices 1200 of FIG. 11 to stably operate in an SPO situation.

The bus 1180 may be a passage for moving data between each component included in the storage device 100. For example, the host interface 1110, the processor 1120, the ADC 1130, the memory interface 1140, the buffer memory 1150, the memory controller 1160, and the user interface 1170 may exchange signals with each other through the bus 1180.

According to at least one embodiment of the inventive concepts, the power supply device 1300 may monitor the degree of deterioration of the auxiliary power supply device 1320, and the controller 1100 may guarantee the dump operation of the storage device 1000 in an SPO situation by controlling the voltage level of the output voltage Vout depending on the degree of deterioration of the auxiliary power supply device 1320, and the life expectancy of the storage device 1000 may be extended. In addition, by reflecting the reduced power in the initial design of the storage device 1000 and omitting at least some of the capacitor included in the auxiliary power supply device 1320, the manufacturing cost of the storage device 1000 may be reduced.

While the inventive concepts have been particularly shown and described with reference to some example embodiments thereof, it will be understood that various changes in form and details may be made therein without departing from the spirit and scope of the following claims.

What is claimed is:

1. A storage device comprising:
   a power supply device including an auxiliary power supply device configured to provide an auxiliary power, the power supply device configured to
   monitor the auxiliary power supply device,
   generate a deterioration monitoring signal, indicating a degree of deterioration of the auxiliary power supply device, based on the monitoring of the auxiliary power supply device, and
   generate an output voltage based on external power or the auxiliary power; and
   a main system configured to
   operate based on the output voltage,
   receive the deterioration monitoring signal,
   compare the degree of deterioration of the auxiliary power supply device with a reference value, and
   perform an operation of backing up data and generate a voltage scaling command for controlling the power supply device to convert an average voltage level of the output voltage to a dynamic voltage scaling (DVS) level.

2. The storage device of claim 1, wherein the main system is configured to
   generate the voltage scaling command when the degree of deterioration of the auxiliary power supply device is less than or equal to the reference value, and
   determine the DVS level based on a voltage level of the output voltage monitored in real time.

3. The storage device of claim 2, wherein the main system is configured to
   calculate a delta value of the output voltage using a minimum voltage level of the output voltage and a maximum voltage level of the output voltage, and
   determine the DVS level to be at least one of a value obtained by adding the delta value to a spec level of the output voltage or a value greater than the value obtained, wherein the spec level is a threshold voltage level of the output voltage determined such that the main system is able to stably operate.

4. The storage device of claim 1, wherein the main system is configured to
   generate the voltage scaling command when the degree of deterioration of the auxiliary power supply device is less than or equal to the reference value, and
   determine the DVS level to be at least one of a value obtained by adding a delta value of a preset output voltage to a spec level of the output voltage or a value greater than the value obtained, wherein the spec level is a threshold voltage level of the output voltage determined such that the main system is able to stably operate.

5. The storage device of claim 1, wherein the main system is configured to
   generate the voltage scaling command when the degree of deterioration of the auxiliary power supply device is less than or equal to the reference value, and
   determine the DVS level to be a fixed value input by a user.

6. The storage device of claim 1, wherein the power supply device comprises:
   a power controller configured to detect a sudden power-off, activate a sudden power-off detection signal, and output an internal power having a constant voltage level by converting the external power or the auxiliary power; and
   an operating voltage provider configured to, based on the internal power, generate the output voltage as one of a plurality of output voltages, the plurality of output voltages including a plurality of respective voltage levels.

7. The storage device of claim 6, wherein the main system is configured to execute the voltage scaling command in response to the activated sudden power-off detection signal.

8. The storage device of claim 1, wherein the power supply device monitors the degree of deterioration of the auxiliary power supply device using a discharge time for the auxiliary power supply device to be discharged.

9. The storage device of claim 1, wherein the power supply device monitors the degree of deterioration of the auxiliary power supply device using a charge time the auxiliary power supply device to be fully charged.

10. The storage device of claim 1, wherein the main system further comprises:
    a first memory configured to temporarily store the voltage scaling command, the first memory and including at least one volatile memory; and
    a second memory including at least one non-volatile memory.

11. The storage device of claim 10, wherein the first memory includes dynamic random access memory (DRAM),
    the second memory includes a NAND flash memory, and
    the storage device includes a controller that controls the first memory and the second memory to back up data stored in the first memory to the second memory in a sudden power-off situation.

12. A storage device comprising:
    an auxiliary power supply device configured to provide an auxiliary power;
    a power controller configured to output an internal power, having a constant voltage level based on one of external power or the auxiliary power, to monitor the auxiliary power supply device, and to generate a deterioration monitoring signal, indicating a degree of deterioration of the auxiliary power supply device, based on the monitoring of the auxiliary power supply device;
    an operating voltage provider configured to generate a plurality of output voltages based on the internal power, the plurality of output voltages having a plurality of voltage levels; and
    a controller configured to receive the deterioration monitoring signal, to compare the degree of deterioration of the auxiliary power supply device with a reference value using the deterioration monitoring signal, and to generate a voltage scaling command for controlling the operating voltage provider to convert an average voltage level of the each of the plurality of output voltages to a corresponding dynamic voltage scaling (DVS) level based on a result of the comparison.

13. The storage device of claim 12, wherein the controller comprises:
    an analog-to-digital converter (ADC) configured to monitor the voltage levels of the plurality of output voltages in real time; and
    firmware configured to determine the corresponding DVS levels based on the plurality of output voltages monitored in real time through the ADC.

14. The storage device of claim 12, wherein
    the power controller is configured to activate a sudden power-off detection signal by detecting a sudden power-off through monitoring a voltage level of the external power, and the controller is configured to execute the voltage scaling command in response to the activated sudden power-off detection signal.

15. A method of operating a storage device which comprises a power supply device including an auxiliary power supply device and a main system configured to operate based on an output voltage output from the power supply device, the method comprising:
  monitoring a degree of deterioration of the auxiliary power supply device;
  comparing the degree of deterioration of the auxiliary power supply device with a reference value;
  generating a voltage scaling command for converting an average voltage level of the output voltage into a dynamic voltage scaling (DVS) level when the degree of deterioration of the auxiliary power supply device is less than the reference value; and
  executing the voltage scaling command when a sudden power-off occurs.

16. The method of claim 15, wherein the generating of the voltage scaling command comprises:
  monitoring a voltage level of the output voltage in real time;
  extracting a minimum voltage level of the output voltage and a maximum voltage level of the output voltage based on the real time monitoring result;
  calculating a delta value of the output voltage using the minimum voltage level of the output voltage and the maximum voltage level of the output voltage;
  determining the DVS level to be at least one of a value obtained by adding the delta value to a spec level of the output voltage or a value greater than the value obtained;
  generating the voltage scaling command based on the determined DVS level; and
  storing the voltage scaling command in a buffer memory included in the main system,
  wherein the spec level is a threshold voltage level of the output voltage determined such that the main system is able to stably operate.

17. The method of claim 16, further comprising:
  adding a first value to the DVS level when the DVS level is less than the value obtained by adding the delta value to the spec level; and
  repeating adding a first value to the DVS level until the DVS level is greater than or equal to the value obtained by adding the delta value to the spec level.

18. The method of claim 15, wherein the generating of the voltage scaling command comprises:
  determining the DVS level to be at least one of a value obtained by adding a delta value of a preset output voltage to a spec level of the output voltage and a value greater than the value obtained;
  generating the voltage scaling command based on the determined DVS level; and
  storing the voltage scaling command in a buffer memory included in the main system,
  wherein the spec level is a threshold voltage level of the output voltage determined such that the main system is able to stably operate.

19. The method of claim 15, wherein the generating of the voltage scaling command comprises:
  determining the DVS level to be a fixed value based on an input by a user;
  generating the voltage scaling command based on the determined DVS level; and
  storing the voltage scaling command in a buffer memory included in the main system.

20. The method of claim 15, further comprising:
  detecting the sudden power-off and activating a sudden power-off detection signal in response to the sudden power-off being detected; and
  performing a dump operation of backing up data in a buffer memory included in the main system to a non-volatile memory device included in the main system, based on the sudden power-off detection signal.

* * * * *